(12) United States Patent
Tee et al.

(10) Patent No.: US 11,474,601 B2
(45) Date of Patent: Oct. 18, 2022

(54) SENSOR-BASED COMMUNICATION APPARATUS AND METHOD, AND COMMUNICATION MEDIUM

(71) Applicant: National University of Singapore, Singapore (SG)

(72) Inventors: Chee Keong Tee, Singapore (SG); Wang Wei Lee, Singapore (SG); Kian Ann Ng, Singapore (SG); John Ho, Singagpore (SG)

(73) Assignee: National University of Singapore, Singapore (SG)

( * ) Notice: Subject to any disclaimer, the term of this patent is extended or adjusted under 35 U.S.C. 154(b) by 67 days.

(21) Appl. No.: 16/769,060

(22) PCT Filed: Dec. 3, 2018

(86) PCT No.: PCT/SG2018/050590
§ 371 (c)(1),
(2) Date: Jun. 2, 2020

(87) PCT Pub. No.: WO2019/112516
PCT Pub. Date: Jun. 13, 2019

(65) Prior Publication Data
US 2020/0333881 A1    Oct. 22, 2020

(30) Foreign Application Priority Data

Dec. 4, 2017 (SG) .............................. 10201710041S

(51) Int. Cl.
*G06F 3/01* (2006.01)
*B25J 13/08* (2006.01)
*G06N 3/04* (2006.01)

(52) U.S. Cl.
CPC ............ *G06F 3/014* (2013.01); *B25J 13/084* (2013.01); *G06F 3/015* (2013.01); *G06F 3/016* (2013.01); *G06N 3/049* (2013.01)

(58) Field of Classification Search
CPC .......... G06F 3/014; G06F 3/015; G06F 3/011; G06F 3/016; G06N 3/049; H04B 14/02; H04L 67/12; B25J 13/084
See application file for complete search history.

(56) References Cited

U.S. PATENT DOCUMENTS

2004/0004999 A1   1/2004  Koerner et al.
2012/0303091 A1  11/2012  Izhikevich
(Continued)

FOREIGN PATENT DOCUMENTS

WO     03094461 A1    11/2003

OTHER PUBLICATIONS

Li H, Pei J, Li G. Real-time tracking based on neuromrophic vision. In2015 15th Non-Volatile Memory Technology Symposium (NVMTS) Oct. 12, 2015 (pp. 1-7). IEEE.
(Continued)

*Primary Examiner* — Towfiq Elahi
(74) *Attorney, Agent, or Firm* — Finnegan, Henderson, Farabow, Garrett & Dunner LLP

(57) ABSTRACT

In a described embodiment, a sensor-based communication apparatus (100) is disclosed. The communication apparatus (100) comprises a plurality of sensor nodes (112) associated with respective unique pulse signatures (200) and adapted to communicate with respective sensors (113) with each sensor (113) configured to generate a sensory signal (113a) in response to a respective stimulus (113b). Each sensor node (112) is triggered, upon receipt of the corresponding sensory signal (113a), to transmit the associated unique pulse signature (200) independently and asynchronously through a
(Continued)

transmission medium (110) shared by the sensor nodes (112), and the unique pulse signatures (200) transmitted by the sensor nodes (112) being a representation (300) of a stimulus event associated with the stimuli detected by the corresponding sensors (113). A method and a communication medium are also disclosed.

41 Claims, 27 Drawing Sheets

(56) References Cited

U.S. PATENT DOCUMENTS

| | | | |
|---|---|---|---|
| 2012/0308136 A1 | 12/2012 | Izhikevich | |
| 2013/0194223 A1* | 8/2013 | Ward | G06F 21/32 345/174 |
| 2016/0250015 A1 | 9/2016 | Kim et al. | |
| 2016/0320834 A1* | 11/2016 | Lee | G06F 3/167 |
| 2017/0135609 A1* | 5/2017 | Eckblad | A61B 5/162 |

OTHER PUBLICATIONS

Lee WW, Kukreja SL, Thakor NV. Discrimination of dynamic tactile contact by temporally precise event sensing in spiking neuromorphic networks. Frontiers in neuroscience. Jan. 31, 2017;11:5, pp. 1-14.

International Search Report for PCT/SG2018/050590 dated Feb. 21, 2019; 4 pages.

Extended European Search Report including Written Opinion for Application No. 18886967.1 dated Nov. 11, 2021, pp. 1-17.

Keong, H.C. et al., "Transmit-Only Ultra Wide Band Body Sensors and Collision Analysis," IEEE Sensors Journal, May 2013, pp. 1949-1958, vol. 13, No. 5. XP011499521.

Partial Supplementary European Search Report including Written Opinion for Application No. 18886967.1 dated Aug. 11, 2021, pp. 1-19.

\* cited by examiner

FIG. 7A(ii)

FIG. 7A(iii)

SENSOR-BASED COMMUNICATION APPARATUS AND METHOD, AND COMMUNICATION MEDIUM

CROSS REFERENCE TO RELATED APPLICATIONS

The present application is a national phase entry under 35 U.S.C. § 371 of International Application No. PCT/SG2018/050590, filed Dec. 3, 2018, which claims priority to Singapore Patent Application No. 102017100415, filed Dec. 4, 2017, the disclosures of which are incorporated by reference herein.

TECHNICAL FIELD

The present disclosure relates to a sensor-based communication apparatus, a sensor-based communication method, and a communication medium.

BACKGROUND

Artificial somatosensory perception typically requires sensor arrays that can capture and process rapidly varying contact stimuli over non-uniform surfaces. Electronic skins (e-skins) are electronic devices that are arrayed to facilitate the sensing of human-machine-environment interactions with applications in advanced collaborative anthropomorphic robots and neuro-prosthetics. Although much progress has been made in developing compliant e-skin sensors with high sensitivity, known signal communication arrangements of such e-skin sensors have numerous disadvantages.

One known arrangement of the sensors relies on conventional Time Division Multiple Access (TDMA) architectures for signal communications, in which the sensors are sampled at a predetermined frequency or predetermined time slots. TDMA based sensor systems are known to have poor scalability because sequential data acquisition leads to a greater transmission latency in larger arrays. Further, the conventional row-column wiring for addressing individual sensors is prone to damage. In addition, highly localized and transient contact stimuli, such as a needle prick or an object slip, may be missed if the sensor sampling frequency is too low.

Another arrangement relies on Code Divisional Multiple Access (CDMA) techniques for wireless signal communications. CDMA is more complex due to the need for signal modulation from an intermediate frequency to a carrier frequency. Additional modules for power regulation are also required. Moreover, CDMA uses level shifted codes, which are relatively susceptible to low frequency interferences (e.g., AC power noises). Further, CDMA typically requires expensive high resolution ADCs. CDMA is also known to have a low capacity.

Another known arrangement involves Address Event Representations (AER). AER relies on asynchronous handshakes to time-multiplex data packets on a first-come-first-served basis. AER requires an implementation of arbitration logic in order to determine which packet to transmit first in the event of a packet collision, which results in a more complex network.

Optical CDMA is another known signal communication arrangement, known to use unipolar pulses and hence requiring additional synchronization signals and protocols. Dedicated electro-optical components are also required.

Yet another arrangement uses Ethernet. It does not support simultaneous packet transmission from a plurality of nodes. Further, transmission overheads (such as Carrier Sense Multiple Access) are needed to prevent packet collision, and multiple, separate conductors are needed to implement the protocols.

It is desirable to provide a sensor-based communication apparatus, a sensor-based communication method, and a communication medium, which address at least one of the drawbacks of the prior art and/or to provide the public with a useful choice.

SUMMARY

According to a first aspect, there is provided a sensor-based communication apparatus comprising: a plurality of sensor nodes associated with respective unique pulse signatures and adapted to communicate with respective sensors with each sensor configured to generate a sensory signal in response to a respective stimulus, wherein each sensor node is triggered, upon receipt of the corresponding sensory signal, to transmit the associated unique pulse signature independently and asynchronously through a transmission medium shared by the sensor nodes, the unique pulse signatures transmitted by the sensor nodes being a representation of a stimulus event associated with the stimuli detected by the corresponding sensors.

The described embodiment is particularly advantageous. For example, since the sensor nodes are configured to transmit the respective pulse signatures independently with each trigger, i.e. on receipt of the stimulus, a highly efficient signalling scheme may be achieved. Since the described embodiment includes using event-based sensing elements responding to a single stimulus event, a resultant pattern in space and time may be used to represent the stimulus event.

Preferably, each inter-pulse interval of the unique pulse signature of each of the sensor nodes may have a unique duration. Such an arrangement is useful in reducing the probability of collision of pulses transmitted by the sensor nodes.

The unique pulse signature may have eight or ten pulses, or any number of pulses. An optimal performance of Signal to Interference and Noise Ratio (SINR) can be achieved when the number of pulses fall within or is close to this range or the alternative range of 8 to 14 pulses.

Alternatively, the unique pulse signature of one of the sensor nodes may have a first number of pulses and the unique pulse signature of another of the sensor nodes may have a second number of pulses different from the first number. This arrangement allows the numbers of pulses to be flexibly determined, for example, based on the types and numbers of associated sensors.

Preferably, the unique pulse signature has a signature duration of 1 ms (millisecond). This allows the sensor nodes to mimic the transmission performance of the biological counterparts. The signature duration may also be adjusted to meet various capacity needs.

Alternatively, the unique pulse signature of one of the sensor nodes may have a first signature duration and the unique pulse signature of another of the sensor nodes may have a second signature duration different from the first signature duration. This arrangement allows the signature durations to be flexibly determined, for example, based on the types and numbers of associated sensors.

Preferably, the unique pulse signature may have a pulse duration of 60 ns (nanoseconds). This allows the sensor nodes to mimic the transmission performance of the biological counterparts. More preferably, the unique pulse signature may have a pulse duration shorter than 60 ns (nanoseconds) which may maximise capacity and minimise error rates.

Alternatively, the unique pulse signature of one of the sensor nodes may have a first pulse duration and the unique pulse signature of another of the sensor nodes may have a second pulse duration different from the first pulse duration. This arrangement allows the pulse durations to be flexibly determined, for example, based on the types and numbers of associated sensors.

Preferably, the apparatus further comprises the sensors. The apparatus may be manufactured so that each sensor node is integrated with or otherwise associated with a corresponding sensor. Where the apparatus does not comprise the sensors, the sensor nodes of the apparatus may be adapted to be associated with external sensors. The sensors may include tactile sensors of different sensitivities. By mixing sensors of different sensitivities, a more accurate, comprehensive representation of the stimulus event can be obtained. Further, the sensors may include temperature sensors. Other types of sensors may also be included such as electro-magnetic, humidity, surface texture, vibration, acceleration and/or optical sensors etc.

Preferably, each sensor node may be triggered, upon receiving a current value in the corresponding sensory signal, to transmit a current one of the associated unique pulse signature to indicate the current value by an interval between the current one of the associated unique pulse signature and a previous one of the associated unique pulse signature. This arrangement is useful when the sensor node is associated with a sensor which generates a sensory signal representing a current value of detection by the sensor. For example, the sensory signal may have a state representing the current value. A slow adapting (SA) sensor (or a piezoresistive resistive element configured to be a slow adapting sensor) is one such sensor.

The sensor nodes may be adapted to be associated with one of a robot, a human and a vehicle, or a robot may comprise such a sensor-based communication apparatus.

Preferably, the sensor nodes may harvest power from an external energy source. Such a source may be a source of electromagnetic waves, mechanical motions, solar energy, chemical substances, or the likes.

The apparatus may further comprise: a receiver configured to receive through the transmission medium an incoming signal relating to the transmitted unique pulse signatures, to correlate the associated unique pulse signature of each sensor node with an intermediate signal relating to the incoming signal, and to provide indication signals indicating respective times of triggering of the sensor nodes based on a result of correlation for representation of the stimulus event. The receiver may be locally or remotely located with respect to the sensor nodes.

Preferably, the receiver includes a plurality of filters each activated, upon detection of an edge in the incoming signal by the receiver, to correlate the intermediate signal with a corresponding one of the unique pulse signatures. This arrangement allows the filters to be activated to correlate the intermediate signal with the signatures in parallel when the edge is detected in the incoming signal. That is, the filters may remain deactivated to save power when no signature is transmitted (thus no edge). Other components (e.g., correlation threshold circuits) associated with the filters may be activated and deactivated correspondingly.

The transmission medium may include a conductive medium, and the sensor nodes may be distributed along the conductive medium and electrically coupled to one another through the conductive medium. Preferably, the sensor nodes are arranged on a surface of the conductive medium. Preferably, the sensor nodes are embedded in the conductive medium. Preferably, the conductive medium is made of polymer. Preferably, the conductive medium is elastic and flexible. Preferably, the conductive medium is mesh or planar in form. With one or more of such arrangements, signal communication via the conductive medium is resistant to damages such as tears. Communication between two portions of the conductive medium remains unaffected unless one portion is completely torn or otherwise removed from the other portion.

The conductive medium may include at least one of a conductive fabric, a conductive bulk conductor, a conductive substrate, a conductive solid, a conductive gel, and a conductive fluid. For example, when the conductive medium is implemented in the form of a fabric or substrate may be suitable for electronic skin applications. For the avoidance of doubt, "fluid" can include, but is not limited to, "liquid".

It is envisaged that each sensor node may be associated with one or more unique pulse signatures. Preferably, each sensor node may be further associated with a further (or another) unique pulse signature. This arrangement is useful when the sensory signal of each sensor has two states. Each sensor node may be triggered, upon receipt of the corresponding sensory signal in a first state, to transmit the associated unique pulse signature, and upon receipt of the corresponding sensory signal in a second state, to transmit the associated further unique pulse signature independently through the transmission medium. The unique pulse signatures associated to each sensor node may correspond to or exceed the number of states in the corresponding sensory signal.

Each sensor node may be configured to transmit the associated further unique pulse signature independently through the transmission medium to indicate an internal state of the respective sensor node. This arrangement reduces the need for another communication path or channel for indicating the internal state.

Further, the unique pulse signatures of each sensor node may have different pulse polarities. For example, two signatures assigned to a sensor node may have the same pulse positions and opposite pulse polarities, where a pulse polarity is a positive or negative voltage potential. Further, two signatures of a sensor node may be otherwise different, either partially or wholly.

Advantageous, the representation of the stimulus event may be a spatiotemporal representation.

In a second aspect, there is provided a sensor-based communication method comprising: receiving a sensory signal generated by a corresponding sensor in response to a respective stimulus, and upon receipt of the sensory signal, triggering respective ones of a plurality of sensor nodes to transmit an associated unique pulse signature independently and asynchronously through a transmission medium shared by the sensor nodes, the unique pulse signatures transmitted by the sensor nodes being a representation of a stimulus event associated with the stimuli detected by the corresponding sensors.

In a third aspect, there is provided a communication medium comprising: a conductive medium; and a plurality of sensor nodes distributed along the conductive medium and electrically coupled to one another through the conductive medium.

The conductive medium of the described embodiment provides a high degree of flexibility in sensor node placement, and provides robust signal conducting paths for the sensor nodes.

It is envisaged that features relating to one aspect may be applicable to the other aspects.

BRIEF DESCRIPTION OF THE DRAWINGS

Example embodiments will now be described hereinafter with reference to the accompanying drawings, wherein like parts are denoted by like reference numerals. Among the drawings:

FIG. 7B is a timing diagram showing a spatiotemporal representation of a stimulation event based on pulse signatures transmitted by five sensor nodes of the apparatus of FIG. 1 in another scenario;

FIG. 7C shows an incoming signal corresponding to the timing diagram of FIG. 7B;

FIG. 7D is a timing diagram showing corresponding indication signals provided by the receiver of FIG. 1 in the scenario of FIG. 7B;

DETAILED DESCRIPTION

Figure 1:
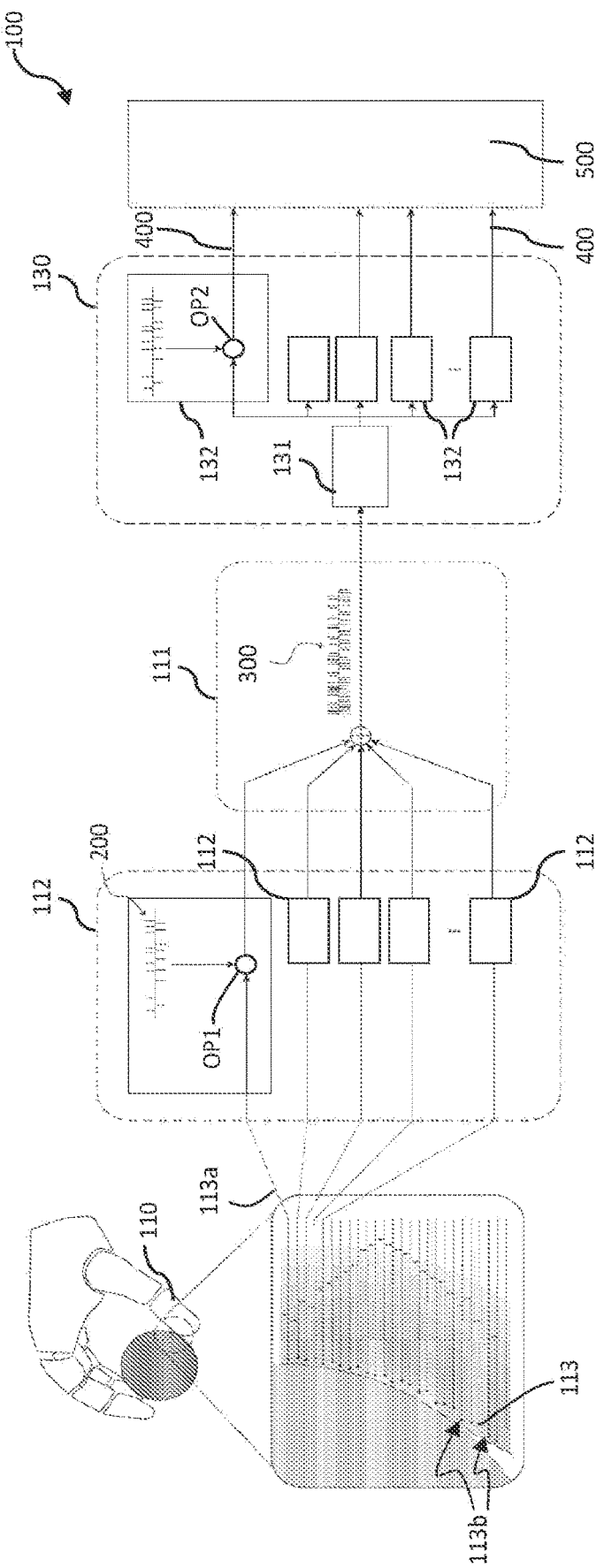
FIG. 1 is a schematic diagram of a sensor-based communication apparatus according to an embodiment of the present disclosure.

FIG. 1 shows a schematic diagram of a sensor-based communication apparatus 100 according to an embodiment of the present disclosure. The apparatus 100 includes a communication medium 110 and a receiver 130. In this embodiment, the communication medium 110 includes a layer of electronic skin shown in FIG. 1 covering or worn by a robotic hand.

Figure 2:
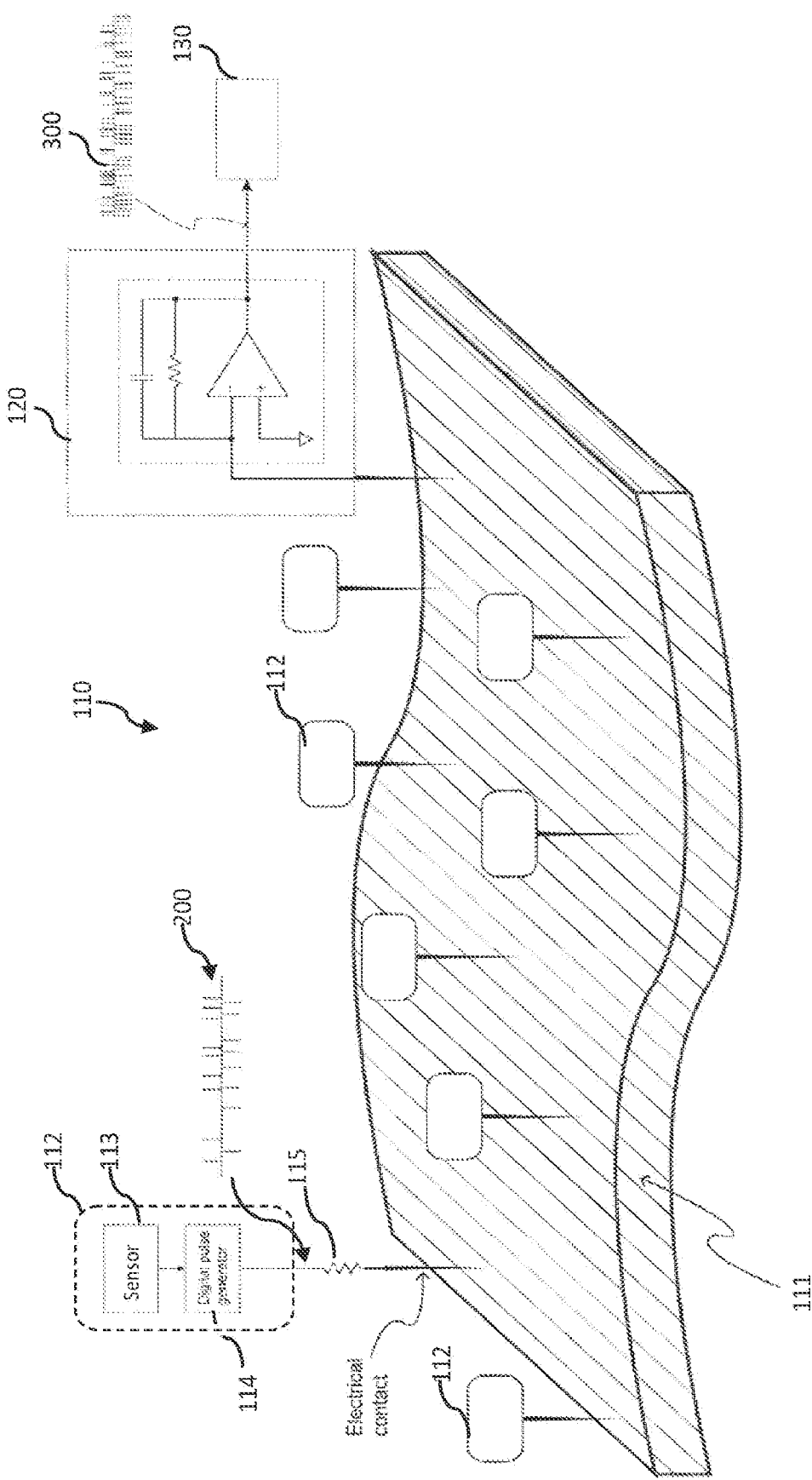
FIG. 2 is an enlarged partial isometric view of a communication medium of the apparatus of FIG. 1.

FIG. 2 shows an enlarged partial isometric view of the communication medium 110. The communication medium 110 includes a conductive fabric 111 (e.g., a conductive substrate or medium) and a plurality of sensor nodes 112 electrically attached to and embedded in the conductive fabric 111. The sensor nodes 112 are associated with respective unique pulse signatures 200 and are adapted to communicate with respective sensors 113. In this embodiment, each sensor node 112 is integrally formed with the corresponding sensor 113, although this may not be the case in other embodiments. Each sensor 113 generates a sensory signal 113a (see FIG. 1) upon detecting a respective stimulus 113b. In the present embodiment, each sensor 113 is a tactile sensor responsive to a touch or pressure to generate the sensory signal 113a. Each sensor node 112 is triggered, upon receipt of the corresponding sensory signal 113a from the respective sensor 113, to transmit the associated unique pulse signature 200 independently through a transmission medium shared by the sensor nodes 112. The transmission medium in this embodiment is the conductive fabric 111 of the communication medium 110. In other embodiments, the transmission medium can be any medium shared by the sensor nodes 112. For example, the transmission medium may be one capable of transmitting vibration/sound, optical, and/or magnetic field signals.

Figure 3:
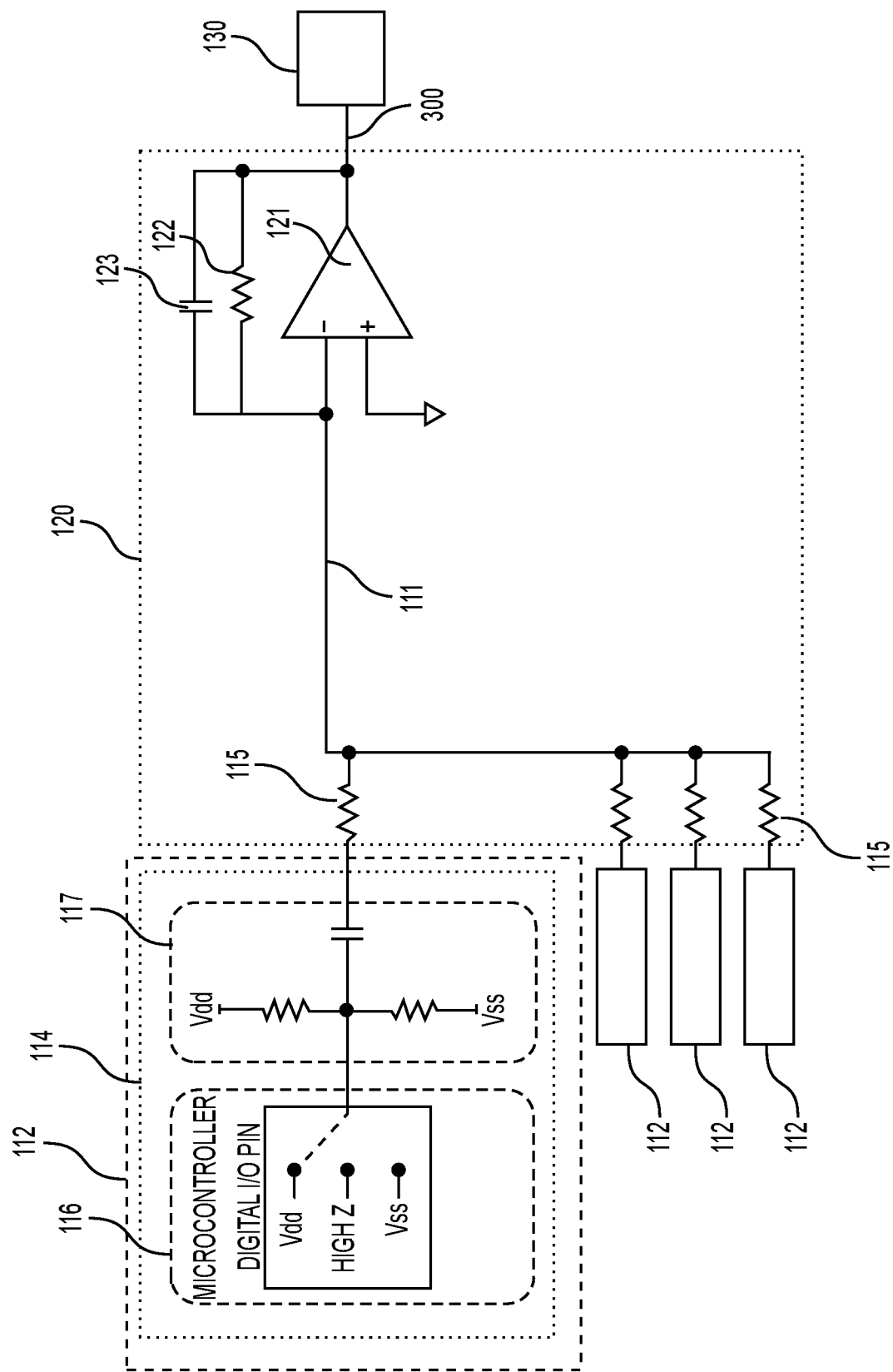
FIG. 3 is a schematic diagram showing some components of each sensor node of the communication medium and a summing circuit of the apparatus of FIG. 1.

In particular, referring to FIG. 3, each sensor node 112 further includes a digital pulse generator 114 associated with the respective sensor 113 (not shown in FIG. 3). The digital pulse generator 114 includes a microcontroller 116 operatively associated with the corresponding sensor 113, and a high-pass filter 117 arranged to filter an output of the microcontroller 116. For each sensor node 112, the microcontroller 116 includes a digital I/O pin moveable between three positions ("Vdd", "High Z" and "Vss") corresponding to positive, resting and negative potentials of the associated unique pulse signature 200, respectively (see FIG. 5). Instructions for generating pulses of the associated unique pulse signature 200 is pre-programmed into the microcontroller 116. The instructions specify a sequence of pulses and a time interval between each adjacent pulse pair. The microcontroller 116 is triggered, upon receipt of the corresponding sensory signal 113a from the respective sensor 113, to generate the pulses of the associated unique pulse signature 200 in real time by moveably switching the digital I/O pin in accordance with the pre-programmed instructions. This operation of the microcontroller 116 for signature generation based on the sensory signal 113a is indicated by the circle marked as "OP1" in FIG. 1. In one arrangement, the microcontroller 116 (Attiny20™ by Microchip Technology™) includes a potential divider circuit for converting a sensor resistance indicated by the respective sensory signal 113a into a voltage. The voltage is then sampled at 10 kHz with a 10-bit resolution by an onboard Analog-to-Digital Converter (ADC) of the microcontroller 116. The sampled values are sent to firmware models to mimic the fast-adapting (FA) or slow adapting (SA) behaviour of receptors found in the human skin, which is explained below. In other embodiments, instead of using a microcontroller to generate the respective pulse signature 200, each sensor node 112 may use, for example, a mechanical (MEMS) switch or a custom electrical circuit to generate the respective pulse signature 200.

The high-pass filter 117 is arranged to filter or condition the pulses generated by the microcontroller 116 to provide the corresponding unique pulse signature 200 for transmission through a gain adjustment resistor 115 associated with the respective sensor node 112 via the conductive fabric 111. The high-pass filter 117 includes two resistors and a capacitor. The resistors are electrically connected in series between a positive supply voltage source used for the positive potential (marked as "Vdd") and a negative supply voltage source used for the negative potential (marked as "Vss"). The capacitor has a first end electrically connected to the digital I/O pin through a node between the resistors, and a second end connected to the conductive fabric 111 through the corresponding gain adjustment resistor 115. The high-pass filter 117 is thus used to filter any direct current (DC) and low frequency components in the respective unique pulse signature 200. The sensor nodes 112 may adopt any other suitable circuitry for pulse generation and filtering. The circuitry illustrated in FIG. 3 is advantageous due to its lower cost and power consumption.

The unique pulse signatures 200 thus transmitted by the sensor nodes 112 through the conductive fabric 111 are (or provide) a representation (e.g., a spatiotemporal representation) of a stimulus event associated with the stimuli 113b detected by the corresponding sensors 113. In this embodiment, as illustrated in FIG. 1, the stimulus event is the robotic hand holding a ball. More particularly, the unique pulse signatures 200 generated and transmitted by the respective sensor nodes 112 collectively serve as a basis for acquisition of a spatiotemporal representation of the stimulus event associated with the stimuli 113b detected by the corresponding sensors 113. With knowledge of locations of the sensor nodes 112 (or the sensors 113) and the respective times of triggering of the sensor nodes 112 (or of pressure detection by the sensors 113), a spatiotemporal representation of the stimulus event can be accurately rendered. That is, the unique pulse signatures 200 transmitted in association with a stimulus event carry or preserve information temporally descriptive of detection of the respective stimuli by the respective sensors 113. Combined with knowledge of locations (or relative locations) of the sensors 113 collocated with the respective sensor nodes 112, a spatiotemporal representation of sensor stimulation can be rendered.

Figure 5:
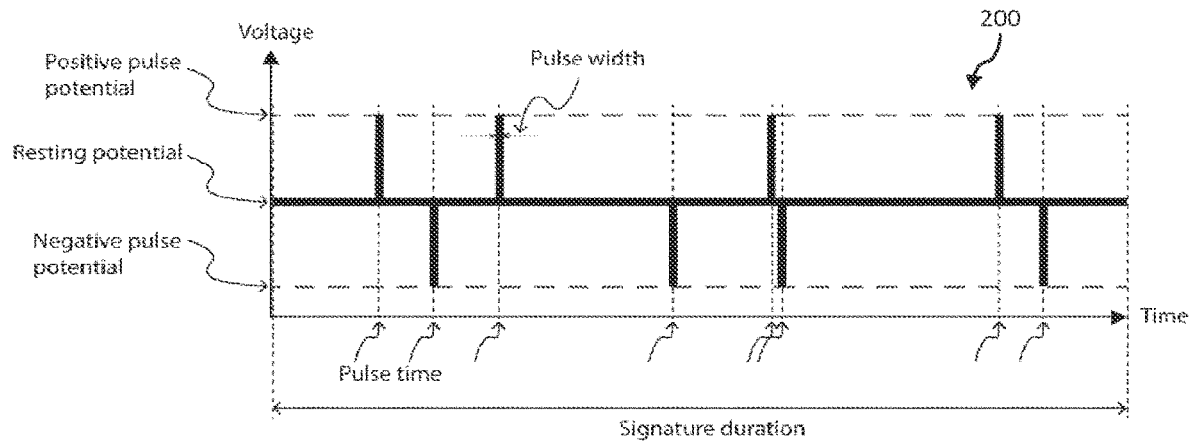
FIG. 5 is a timing diagram of a unique pulse signature of one of the sensor nodes of the apparatus of FIG. 1.

FIG. 5 shows the unique pulse signature 200 transmitted by one of the sensor nodes 112 through the conductive fabric 111. In this embodiment, the unique pulse signature 200 is bipolar and transmitted independently and asynchronously by the respective sensor node 112. In this particular example embodiment, each inter-pulse interval of each unique pulse signature 200 has a unique duration (see FIG. 6), and the unique pulse signature 200 has eight pulses, and a signature duration of 1 ms (millisecond), and the unique pulse signature 200 has a pulse duration of 60 ns (nanoseconds). Each neighbouring pair of pulses of each unique pulse signature 200 has a unique duration in the apparatus 100. The total number of voltage pulses in a pulse signature 200 denotes a 'weight' of the pulse signature 200. The signature duration of 1 ms specifies a maximum allowed time difference from the first voltage pulse to the last voltage pulse of a pulse signature 200.

Referring again to FIG. 3, the apparatus 100 further includes a summing circuit 120 electrically associated with the sensor nodes 112 and the receiver 130. The summing circuit 120 includes an operational amplifier 121 with a non-inverting input terminal that is grounded and an inverting input terminal that is electrically connected to the conductive fabric 111. The summing circuit 120 further includes a parallel connection of a resistor 122 and a capacitor 123 electrically connected across the inverting terminal and an output terminal of the operational amplifier 121, with the output terminal being connected to the receiver 130. With such a configuration, the summing circuit 120 serves to filter or suppress any DC components in the unique pulse signatures 200 transmitted by the sensor nodes 112 and also to 'sum' or combine the unique pulse signatures 200 in time domain for transmission through the conductive fabric 111 for receipt by the receiver 130. The summing circuit 120 may form part of the receiver 130 in other embodiments. In such a configuration, the summing circuit 120 may clip any portions of the summed or combined signatures 200 exceeding supply rails of the operational amplifier 121, provided that the time position of each pulse in the summed or combined signatures 200 remains unaffected by the clipping operation. Depending on implementation, the summing circuit 120 may further include the resistors 115 and the conductive fabric 111, such that the summing circuit 120 may be considered to be distributed across the transmission medium. As shown in FIG. 2 with respect to one of the sensor nodes 112, in the distributed arrangement, the resistors 115 of the summing circuit 120 are arranged proximate to the respective sensor nodes 112 and distal from the other components 121-123 of the summing circuit 120. In the current embodiment of FIG. 3, the operational amplifier 121, the resistor 122 and the capacitor 123 are disposed proximate or at the receiver 130 for consideration of convenience, size and power constraints.

Figure 4:
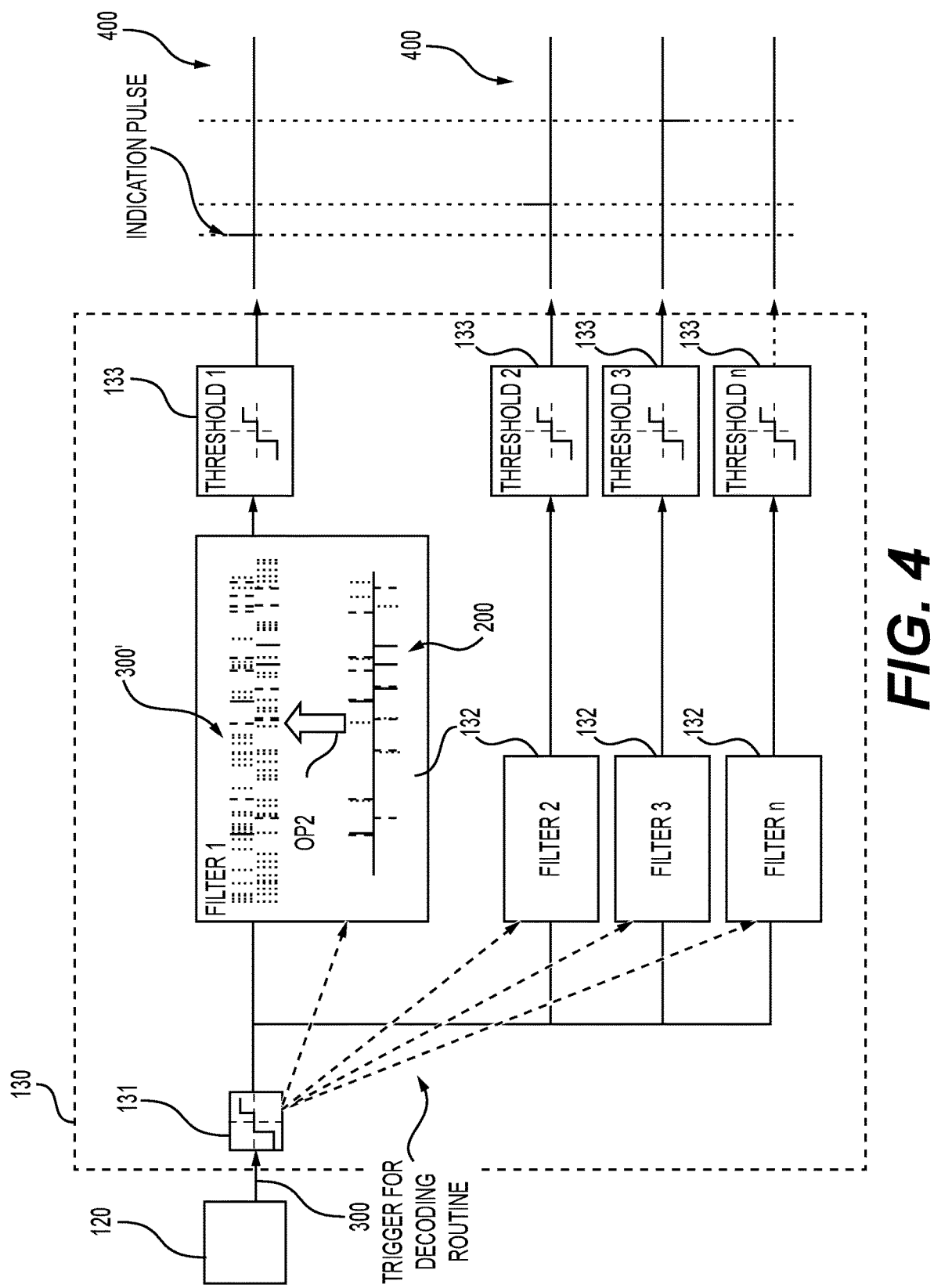
FIG. 4 is a schematic diagram showing some components of a receiver of the apparatus of FIG. 1.

FIGS. 1 and 2 also show a representation of the unique pulse signatures 200 independently transmitted by the sensor nodes 112 to collectively form an incoming signal 300 to be received by the receiver 130 via the conductive fabric 111 through the summing circuit 120. In the form of the incoming signal 300, the signatures 200 may be considered to be combined or superposed since they are independently and asynchronously transmitted when the corresponding sensor nodes 112 are triggered. It can be seen that the pulses in the incoming signal 300 are mostly staggered. With reference to FIG. 4, the receiver 130 includes a detection and digitisation circuit 131 and a plurality of filters 132, which are digital filters in this embodiment. The detection and digitisation circuit 131 is arranged to detect an edge in the incoming signal 300, to activate the filters 132 upon edge detection, and to perform analog-to-digital conversion on the incoming signal 300 to provide an intermediate signal 300'. With this configuration, the filters 132 are activated only when an edge is detected in the incoming signal 300 by the detection and digitisation circuit 131. Power consumption of the receiver 130 may thus be reduced. The receiver 130 may thus be particularly suitable for use in scenarios of sparse or infrequent stimulation events. As the transmitted signatures 200, as discussed above, are a representation of the stimulus event, the incoming signal 300 resulting from the transmitted signature 200 may be considered to be a representation of the stimulus event.

Each of the filters 132 is configured to detect the unique pulse signature 200 of a respective one of the sensor nodes 112 in the intermediate signal 300' to indicate a time of triggering of the respective sensor node 112 in association with the stimulus event. Specifically, each filter 132 is configured to perform a correlation operation (e.g., convolution or multiplication in time domain) on the intermediate signal 300' with the corresponding unique pulse signature 200 to provide an indication signal 400 to indicate the corresponding time of triggering of the corresponding sensor node 112 in the form of a pulse ("indication pulse", FIG. 4). This correlation operation is indicated by a circle marked as "OP2" in FIG. 1. The indication signal 400 may be a continuous signal with the indication pulse at the time of high correlation to indicate the generation of the sensory signal 113a by the corresponding sensor 113. The indication pulse may be a positive pulse representing a binary '1' or a negative pulse representing a binary '0'. In FIG. 4, two positive indication pulses and one negative indication pulse are shown. In this example, irrespective of the polarity, a pulse in the indication signal 400 indicates a detection of tactile pressure by the corresponding sensor 113. The unique pulse signatures 200 may be pre-programmed into the receiver 130 for use by the respective filters 132.

As illustrated in FIG. 4, the receiver 130 further includes a plurality of threshold circuit 133 associated with the filters 132, respectively. Each threshold circuit 133 is configured to suppress an indication pulse in the corresponding indication signal 400 if the corresponding result of correlation operation is below a correlation threshold value. For example, with an example correlation threshold value of 7 (e.g., if the intermediate signal 300' correlates concurrently with at least seven pulses of the respective signature 200 at a given time point), if the result of a correlation operation for a signature is 6 (i.e., below the correlation threshold value), the indication pulse generated by the corresponding filter is suppressed by the corresponding threshold circuit 133 due to the likelihood of error (i.e., low correlation). The correlation threshold value may be adjusted based on statistic values of, for example, the filters 132. The indication signals 400 are then received by a computing device 500 for storage, presentation or any other use. Activation and deactivation of the threshold circuits 133 may depend on those of the respective filters 132.

Figure 7A:
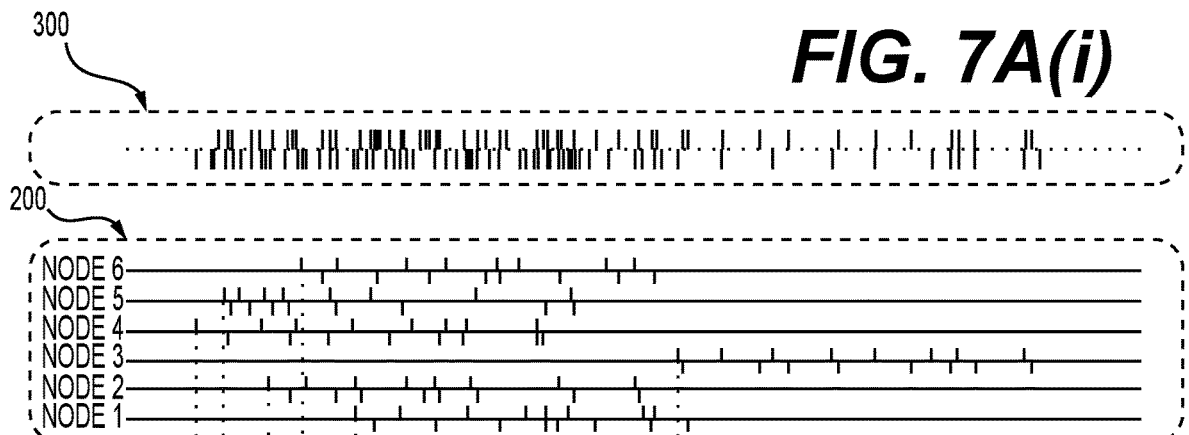
FIG. 7A comprises FIG. 7A(i), (ii) and (iii) to compare timing diagrams of an incoming signal received by the receiver of the apparatus of FIG. 1 and indication signals accordingly generated by the receiver of the apparatus of FIG. 1 in one scenario.
Figure 7A:
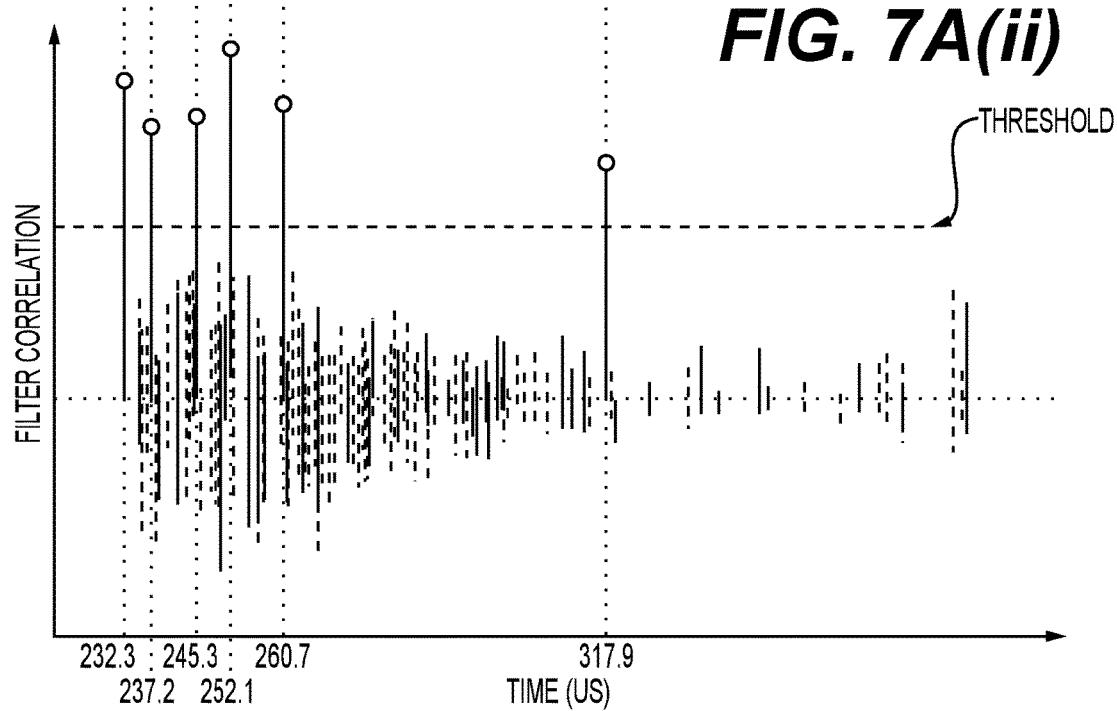

FIG. 7A shows three timing diagrams (i), (ii) and (iii) obtained using the apparatus 100 in another configuration involving six sensor nodes 112 associated with respective unique pulse signatures 200 of 16 pulses. The top pulse diagram (i) shows the incoming signal 300 received by the receiver 130 with the incoming signal 300 formed from pulse signatures 200 transmitted by the six sensor nodes 112 illustrated in pulse diagram (ii). The bottom diagram (iii) shows the indication signals 400 of the filters 132, with the correlation threshold values of the threshold circuits 133 marked by the dash horizontal line. In the bottom diagram, each small circle marks a respective time point of high correlation where a result of correlation of the intermediate signal 300' with the corresponding unique pulse signature 200' exceeds the correlation threshold value of the respective threshold circuit 133. It can be appreciated that the relative times of stimulus detection by the respective sensors 113 can be accurately determined or resolved based on the respective time points (i.e., the respective indication pulses) of high correlation. For instance, referring to FIG. 7A(iii), signature transmission by Node 4 occurs 4.9 µs earlier than that by Node 5. A conventional time multiplexed system cannot achieve such a level of temporal resolution without adopting a frame rate in the megahertz range, which is not possible in most practical situations involving large arrays of sensors. For instance, a conventional 256 element slip detection array with a 1.9 kHz sampling rate is considered a very high speed sensor array by the current standard, and can only achieve a temporal resolution of approximately 500 µs, which is at least 500 times slower than the sampling rate achievable with the apparatus 100.

FIG. 7B is a diagram showing transmission of unique pulse signatures 200 by five sensor nodes 112 in association with a stimulus event to illustrate the spatiotemporal nature of the stimulation event. By way of illustration, the first pulse of each signature 200 is marked by a hollow circle AA, and each hollow circle AA is linked by a respective dashed line BB to another hollow circle AA. This is an example spatiotemporal representation of stimulation of respective sensors 112 in association with the stimulus event (e.g., a touch). In this particular example, the unique pulse signature 200 of each sensor node 112 begins with a positive pulse. The first pulse of each signature 200 transmitted in association with the stimulus event can thus indicate a relative time point of triggering of the respective sensor node 112 by the sensory signal 130a of the respective sensor 113.

FIG. 7C shows the signatures 200 of FIG. 7B combined to form an incoming signal 300 for receipt by the receiver 130. FIG. 7D shows indication signals 400 corresponding to the sensor nodes 112 of FIG. 7B, provided by the receiver 130 based on the incoming signal 300 of FIG. 7C. For each sensor node 112, each hollow circle AA marks a time point where a result of correlation between the corresponding unique pulse signature 200 and the intermediate signal 300' exceeds the correlation threshold value marked by the corresponding shaded area. Each hollow circle AA is shown to be connected by a respective dashed line BB to another hollow circle AA to illustrate the spatiotemporal nature of the signal. It can be appreciated that the relative time points of the hollow circles AA in FIG. 7D are similar or identical to those shown in FIG. 7B. This means that a spatiotemporal pattern of sensor stimulation can be represented with reference to the time points of high signature correlation. Thus, with knowledge of physical locations of the sensors 113 (or of the sensor nodes 112), a spatiotemporal representation of the stimulus event can be rendered based on the relative time points of high correlation.

Figure 8:
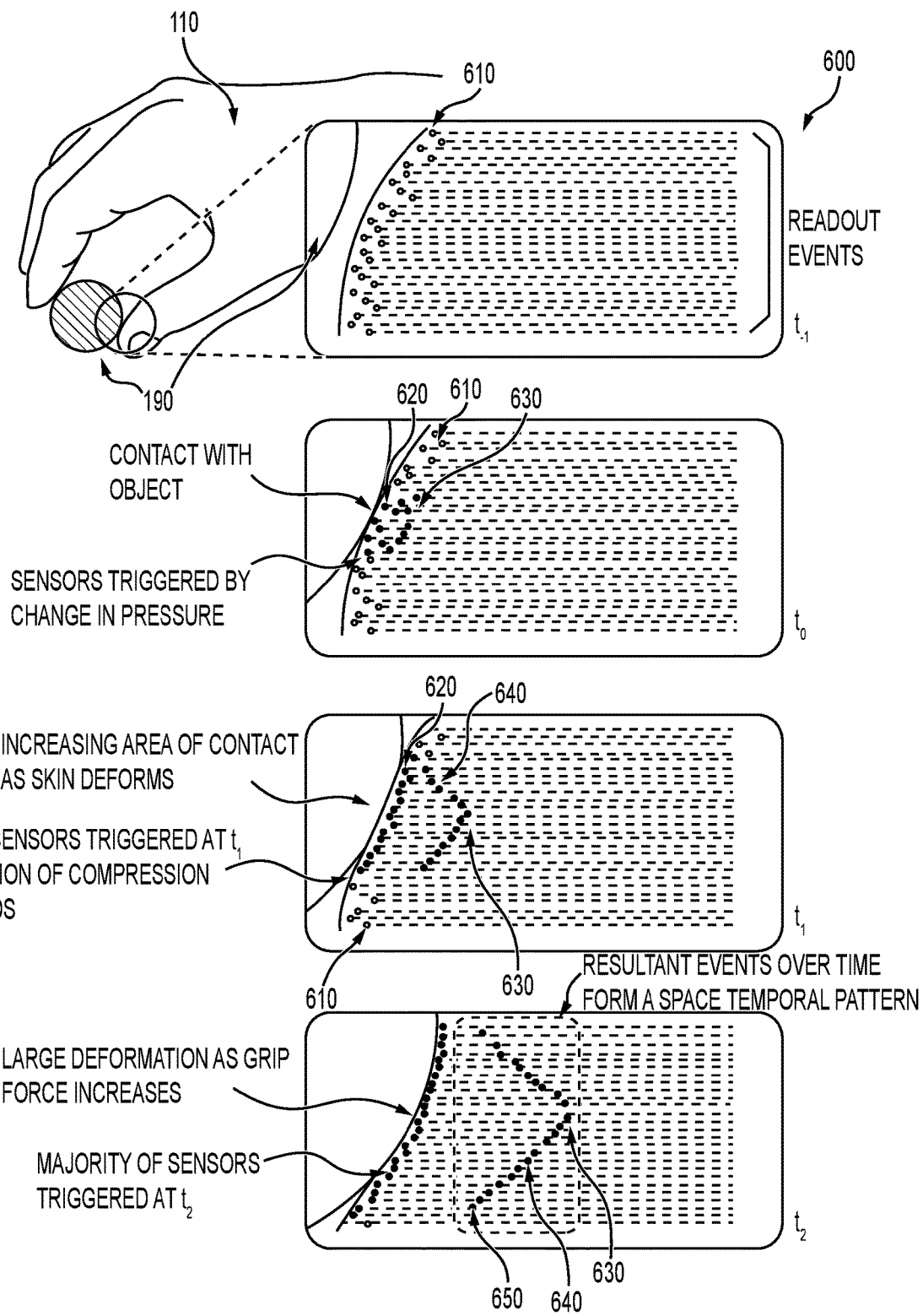
FIG. 8 shows a series of representations of different time points, illustrating a spatiotemporal representation of a tactile stimulation event.

FIG. 8 illustrates an example spatiotemporal representation 600 of a stimulus event associated with stimuli detected by the sensors 113 based on the indication signals 400 in another scenario. In this example, the communication medium 110 is implemented in the form of electronic skin (or a thin glove) and is worn on the right hand of a human user pinching a solid round object 190. Based on the indication signals 400 and knowledge of locations (either relative or absolute) of the sensor 113, times (or time points) of tactile pressure detection by the respective sensors 113 can be spatiotemporally represented.

At time point $t_{-1}$, the communication medium 110 is not yet in contact with the object 190. A non-detection status of each sensor 113 is marked by a small hollow circle 610.

At time point $t_0$, the communication medium 110 comes into contact with the object 190, and a small portion of the sensors 113 detect tactile pressure as a form of stimulus 113b, where a detection status of each sensor 113 is marked by a small solid circle 620. For each sensor 113 of the detection status, the resultant indication pulse 630 in the corresponding indication signal 400 is shown on a corresponding horizontal line. A distance between the indication pulse 630 and the corresponding solid small circle 620 along the corresponding horizontal line is proportional to an amount of elapsed time since pressure detection by the corresponding sensor 113. That is, the indication pulse 630 moves towards the right along the corresponding horizontal line as time passes.

At time point $t_1$, the communication medium 110 deforms and a larger portion of the sensor nodes 112 come into contact with the round object 190, indicated by more indication pulses 630, 640. It can be seen that the indication pulses 630 generated by the small portion of the sensor nodes 112 at time to have moved further to the right, indicating that more time has elapsed since the pressure detection by the sensors 113 of those indication pulses 630.

At time point $t_2$, the communication medium 110 deforms more as the grip force on the round object 190 increases and an even larger portion of the sensor nodes 112 come into contact with the object 190, indicated by even more indication pulses 630-650. A clear spatiotemporal pattern formed by the generated indication pulses 630-650 and representing the stimulus event of pinching the round object 190 can be clearly observed.

Figure 9A:
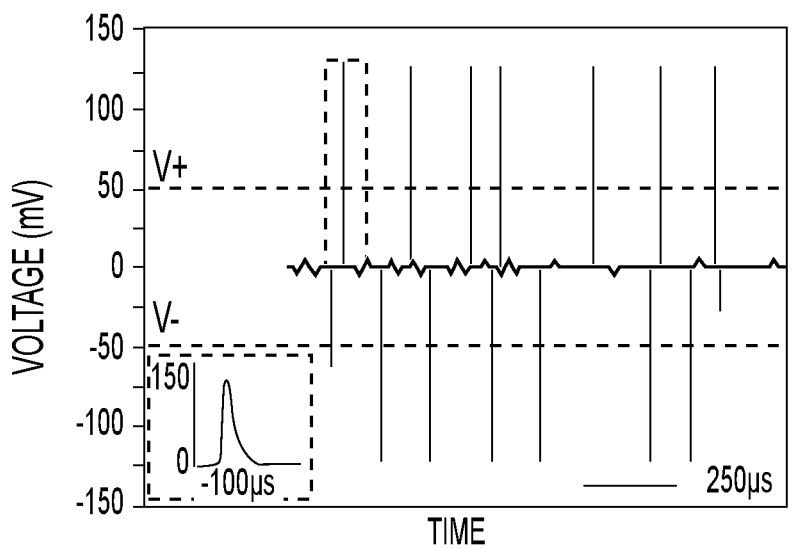
FIG. 9A is a timing diagram of another example pulse signature with 14 pulses.

FIG. 9A shows another pulse signature with 14 pulses (weight, W, of 14) after quantisation, with the first pulse marked by a rectangular box. 'V+' and 'V−' mark the quantization thresholds for pulse detection, respectively.

Figure 9B:
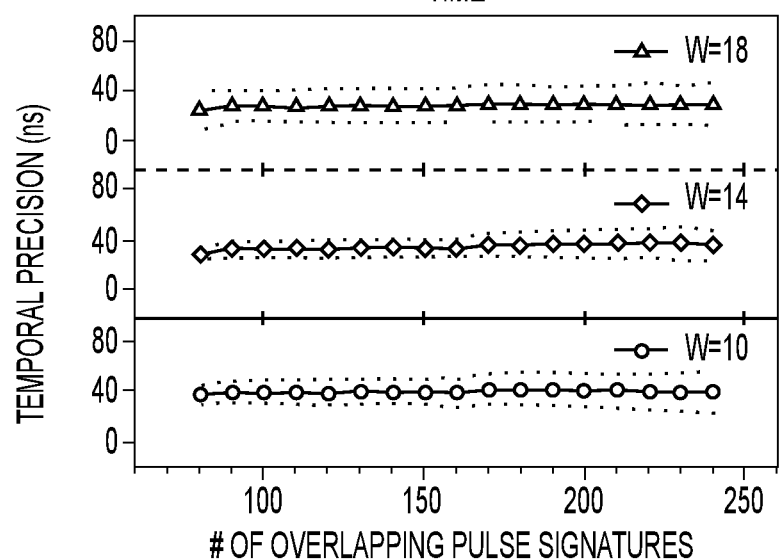
FIG. 9B is a diagram of temporal precisions versus numbers of overlapping pulse signatures.

FIG. 9B shows a diagram of temporal precisions of the indication signals 400 versus numbers of overlapping pulse signatures 200, for different numbers of pulses (or weights, W) in each signature 200, obtained with 240 sensors in an actual experiment. The shaded regions indicate respective standard deviations. The output of the receiver 130 maintains the relative time differences of the transmitted unique pulse signatures 200 with a temporal precision of 60 ns or less. The transmission latency is also constant, dependent only on the duration of the pulse signature 200 and not the number of sensor nodes 112.

Figure 9C:
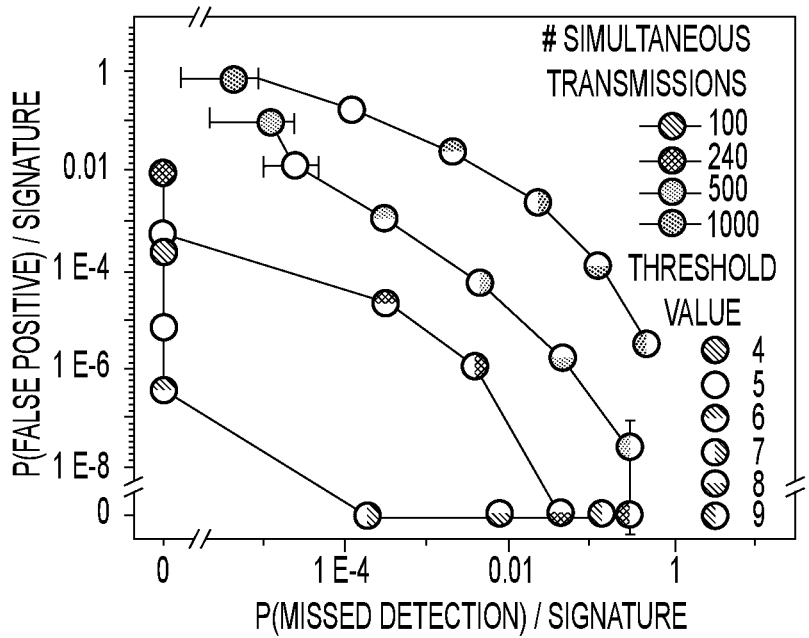
FIG. 9C is a diagram showing relationships between correlation threshold values with detection error probabilities.

FIG. 9C shows relationships between correlation threshold values and detection error probabilities (transmission error rate) with a weight, W, of 10. With 240 simultaneously transmitting sensor nodes 112 (simultaneous transmission for ensuring the occurrence of collision) and a correlation threshold value of 6, a false positive probability of 0.000023 (0.0023%) and a missed detection probability of 0.00031 (0.031%) can be achieved. Using a Monte Carlo simulation, even with 1000 overlapping signatures 200, it is possible to achieve a probability of false positive detection of 0.024 (or 2.4%) or a probability of missed detection of 0.0021 (or 0.21%). Given the typically sparse nature of tactile events, the probability of 1000 overlapping signatures 200 is expected to be low. The dashed lines in FIG. 9C represent simulation results. The result of FIG. 9C is obtained, with a 95% confidence bounds. In the simulation of FIG. 9C, each sensor node 112 transmits a single symbol (i.e., pulse). The extent of overlap between any two symbols takes a uniform random distribution from a minimum of 1 pulse width to a maximum of the entire signature duration. The polarity of the transmitted symbol is also randomly assigned. The codes (i.e., signatures 200) used in this simulation have a maximum auto and cross-correlation value of 2. Pulse widths are of 60 ns in duration and all pulse signatures 200 have a duration of 1 ms. 100,000 Monte-Carlo trials are conducted for each combination of signature weights (i.e., the number of pulses in each signature 200) and number of sensor nodes.

Figure 9D:
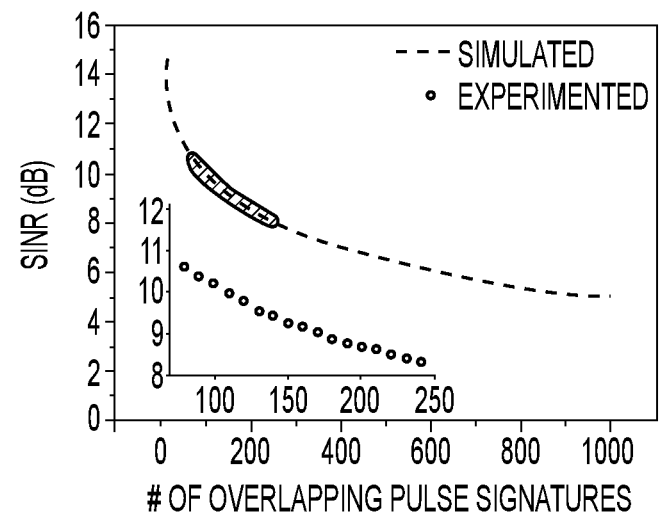
FIG. 9D shows a diagram of Signal to Interference and Noise Ratio (SINR) of an output of the receiver of FIG. 1 versus the number of overlapping signatures, obtained in each of a simulation and an experiment.

FIG. 9D shows a diagram of Signal to Interference and Noise Ratio (SINR) of the output (i.e., the indication signals 400) of the receiver 130 versus the number of overlapping signatures 200 with a weight, W, of 10 and a pulse width of 60 ns. In FIG. 9D, the dashed line indicates results by Monte-Carlo simulation and the line marked by squares indicates actual results and shows a trend similar to that of the dashed line.

Figure 9E:
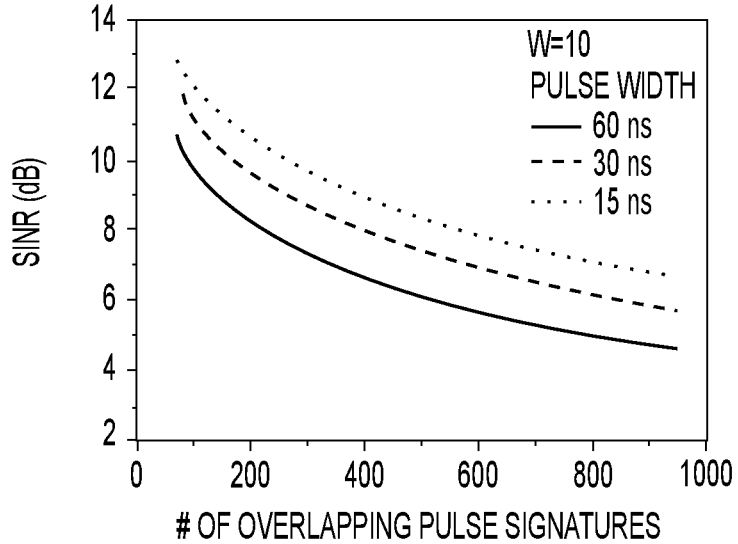
FIG. 9E shows a diagram of SINR of the output of the receiver of FIG. 1 versus the number of overlapping signatures, obtained for different pulse widths.

FIG. 9E shows a diagram of SINR of the output of the receiver 130 versus the number of overlapping signatures 200, obtained for different pulse widths using simulation. It can be appreciated that the SINR of the output of the receiver 130 can be improved by reducing the pulse width or duration.

Figure 9F:
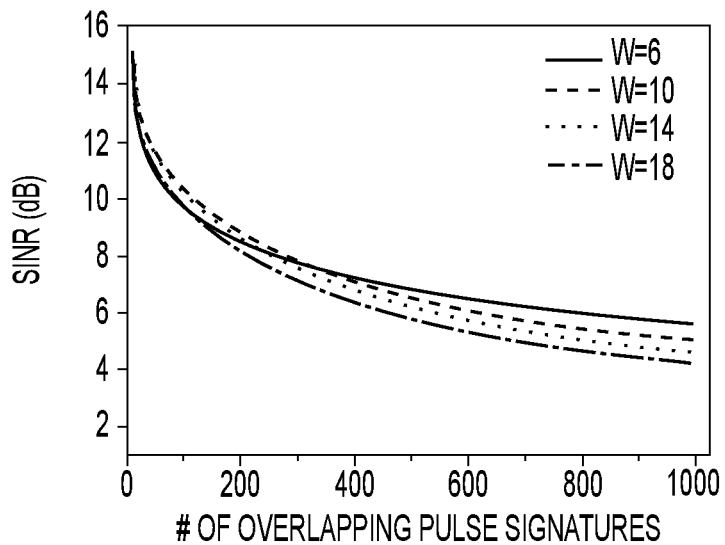
FIG. 9F shows a diagram of SINR of the output of the receiver of FIG. 1 versus the number of overlapping signatures, obtained for different numbers of pulses in each signature.

FIG. 9F shows a diagram of SINR of the output of the receiver 130 versus the number of overlapping signatures 200, obtained for different weights (i.e., numbers of pulses in each signature 200) using simulation based on a pulse width of 60 ns. While larger signature weights (W) improves SINR substantially where the number of overlapping signatures is less than 100, the opposite is true where the number of overlapping signatures is higher. Therefore, a weight of 10 may be optimal.

The SINR characterizes the separability of a stimulus detection from interference, based on the output of the receiver 130. In an experiment, a physical hardware test setup with an array of two hundred and forty sensor nodes, each programmed with a unique pulse signature, is developed to determine the SINR. Each trial begins with an external digital edge signal that is broadcast to all sensor nodes to triggering the sensor nodes to transmit the respective pulse signatures after a random delay of less than 1 ms. This ensures that the two hundred and forty transmitted signatures will overlap at varying temporal offsets between trials. For trials involving less than two hundred and forty sensor nodes, the excluded sensor nodes may be programmed to ignore the trigger.

Sixteen of the two hundred and forty sensor nodes have probes attached to their transmission pins (digital pins), respectively. Signals from these probes serve as the ground truth on the actual time and polarity of the pulses transmitted. The digital signals from these sixteen probes, as well as the combined pulse signatures from the two hundred and forty sensor nodes are digitized at 125 MHz simultaneously by a mixed signal oscilloscope (Picoscope 3406D), thus ensuring that all channels are synchronized in time.

The SINR is computed for the receiver 130 associated with the sixteen probed sensor nodes. An interference value is computed as the root-mean-squared (RMS) value of the receiver output as the corresponding sensor node transmits its pulse signature. The last 100 ns of the receiver output is excluded from the RMS computation, since it corresponds to the detection of the correct pulse signature and should not be considered as interference. SINR is then computed as the ratio between the signature weight W and the interference value. For each network size, 1000 trials were conducted, and the reported SINR is averaged from the 16 receivers across all 1000 trials.

Timing precision is obtained as the difference in time between the start of last pulse transmission, as obtained from the attached probe, and the transmission time as determined from the output of the receiver. The reported timing precision in FIG. 9B is obtained as an average across all the 1000 trials for each network size.

Figure 10:
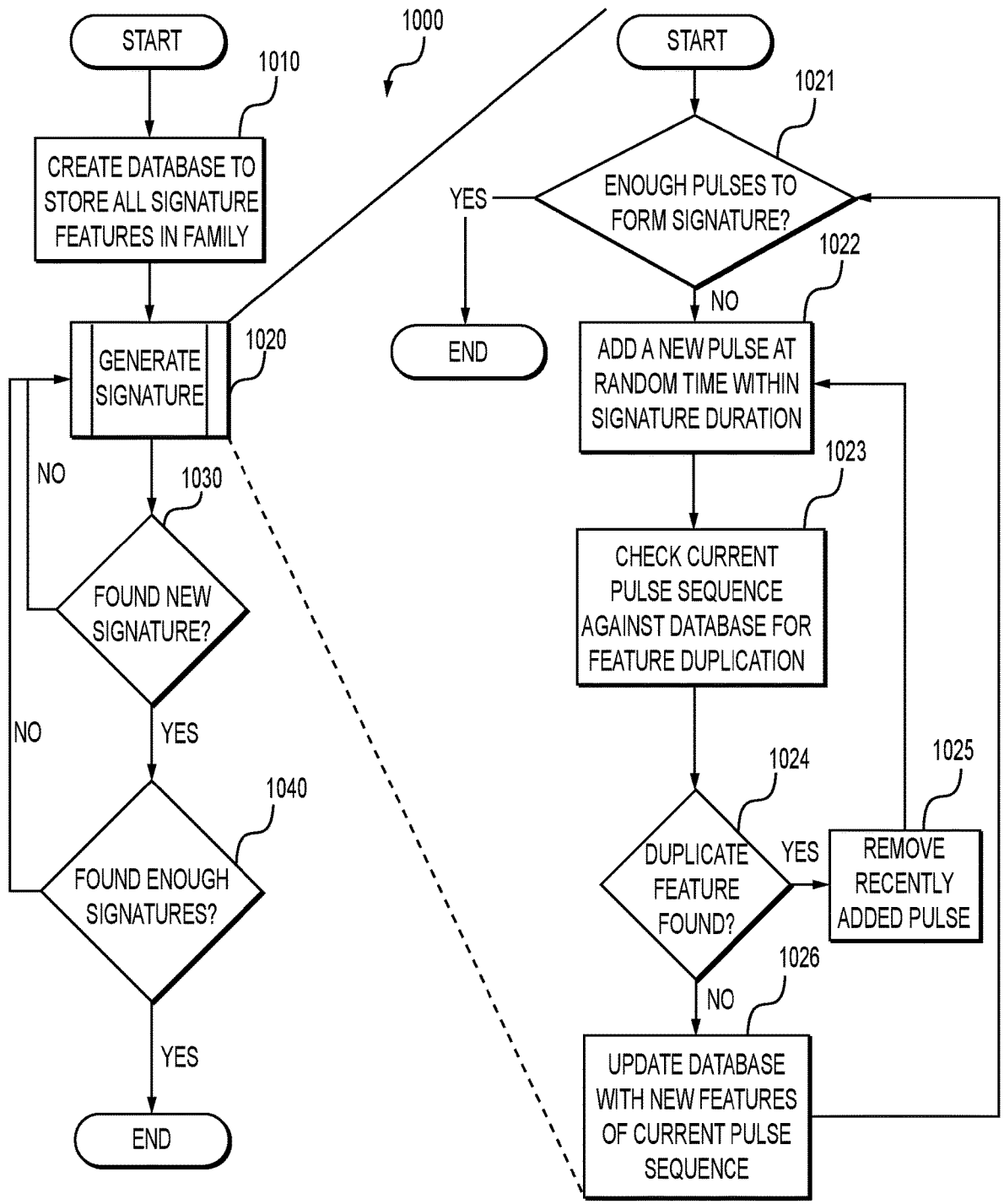
FIG. 10 shows steps of an example method of an algorithm for generating pulse signatures for use by the apparatus of FIG. 1.

FIG. 10 shows a flowchart of an example algorithm or method 1000 which may be used for generating the pulse signatures 200 for the apparatus 100. The method 1000 includes steps 1010 to 1040, where step 1020 includes sub-steps 1021 to 1026.

Step 1010 includes creating a database to store the unique pulse signatures 200 to be associated with the sensor nodes 112, and is followed by step 1020.

Step 1020 includes generating a family or set of signatures 200 by performing sub-steps 1021 to 1026.

Sub-step 1021 includes determining whether enough pulses have been generated to form a unique signature 200 of a specified weight, ending step 1020 and proceeding to step 1030 if affirmative, and proceeding to sub-step 1022 if otherwise. The effect of the determination of sub-steps 1021 is to ensure that the pulse positions of the signature 200 being generated are iteratively searched to make sure that duplicate temporal features are not used within the family of signatures 200 and that the pulse sequence being generated meets the specified weight.

Sub-step 1022 includes adding a new pulse at random time within the specified signature duration, and is followed by sub-step 1023.

Sub-step 1023 includes checking the pulse sequence of the current signature 200 being generated against the created database for any duplicate sequence in the database, and is followed by sub-step 1024.

Sub-step 1024 includes determining whether a duplicate sequence has been found in the database in sub-step 1023, proceeding to sub-step 1025 if affirmative, and proceeding to sub-step 1026 if otherwise.

Sub-step 1025 includes removing the most recently added pulse in the signature 200 being generated, and is followed by sub-step 1022.

Sub-step 1026 includes updating the created database with the current pulse sequence as a new signature 200 (i.e., adding the current pulse sequence as a new signature 200), and is followed by sub-step 1021. The effect of sub-step 1026 is to update the database with the current pulse sequence resulting from the addition of the current pulse, so that, if the next determination in sub-step 1021 is negative, the search for the next pulse position in sub-step 1022 uses the current pulse sequence in the updated database.

In such a manner, each signature 200 generated in step 1020 is unique in the database.

Step 1030 includes determining whether a new signature 200 has been found, proceeding to step 1040 if affirmative, and proceeding back to step 1020 if otherwise.

Step 1040 includes determining whether enough signatures 200 have been found for the sensor nodes, ending the process if affirmative, and proceeding back to step 1020 if otherwise.

Step 1030 may be combined with step 1040 if step 1020 is modified to iterate an endless loop for signature generation, to be terminated after a certain period of time to start over. It is envisaged that some of the steps and sub-steps of the method 1000 may be modified, combined, or omitted, provided that unique pulse signatures 200 can be generated.

With the use of this algorithm of FIG. 10, autocorrelation and cross-correlation may be reduced whilst allowing enough unique pulse signatures 200 to be assigned to the sensor nodes 112. With the number of signatures 200 being larger than or equal to the number of the sensor nodes 112, a family of pulse signatures may be characterized by three parameters $\Phi(F, \omega, \lambda)$, where:

F is the duration of each pulse signature in the family,
$\omega$ is the number of pulses per signature, and
$\lambda$ is the maximum allowed interference between signatures within the family.

With F and ω determined, the temporal position of each individual pulse in each signature can then be determined to meet λ. For the computation of λ, consider two pulse signatures, s and s', both with ω=4 and having pulses at times $\{\tau_1, \tau_2, \tau_3, \tau_4\}$ and $\{\tau'_1, \tau'_2, \tau'_3, \tau'_4\}$ respectively. Convolution of s with s' results in at least 1 overlapping pulse, giving λ≥1. However, the pulse signatures can be designed to have, at most, one overlapping pulse. This can be achieved by ensuring that each inter-pulse interval in each pulse signature is unique, as is the case with the embodiment of FIG. 1. In the case of s and s', there are $^4C_2$ (i.e., six) inter-pulse intervals per signature. To achieve λ=1, all 12 inter-pulse intervals (from s and s') must be unique.

Figure 6:
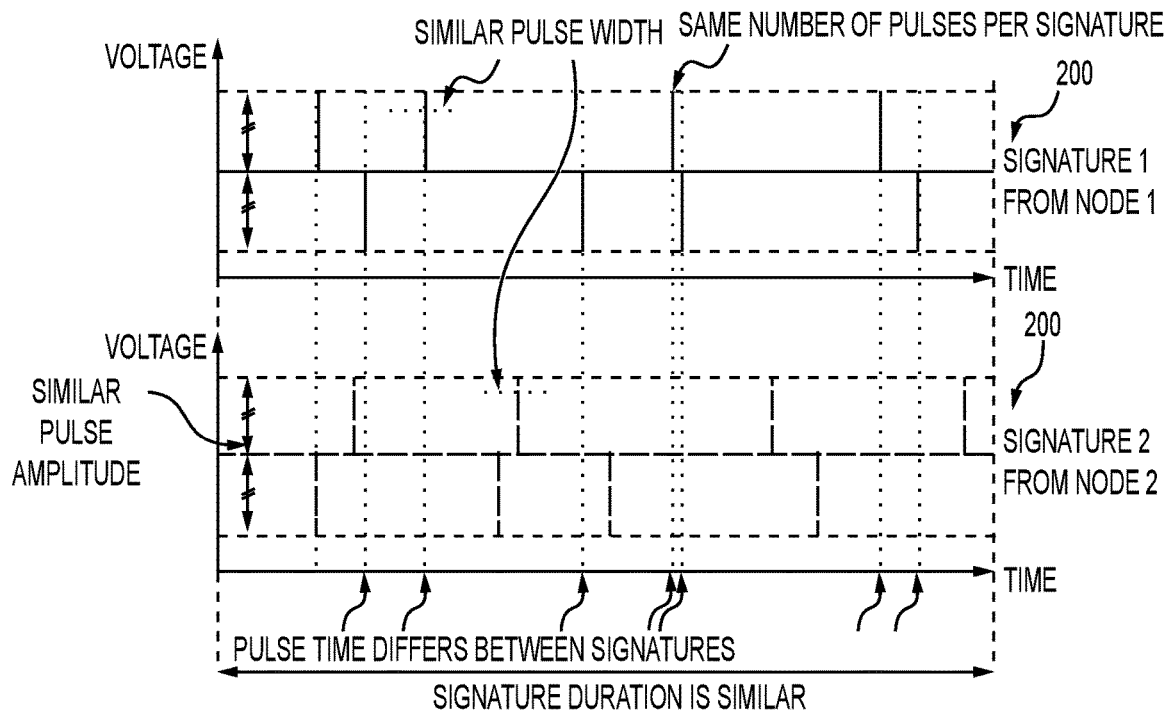
FIG. 6 is another timing diagram of another unique pulse signature of another one of the sensor nodes of the apparatus of FIG. 1, shown next to the timing diagram of FIG. 5 for comparison.

Expanding to a case where λ>1, the concept of temporal pulse features $P_\lambda$ is introduced. For example, if λ=2, the feature $P_2$ will have two elements $\{\rho_1, \rho_2\}$, where $\rho_1$ and $\rho_2$ are an ordered pair of inter-pulse intervals. In the case of s and s', there are $^4C_3$ (i.e., four) $P_2$ features per signature. To ensure λ=2, all $P_2$ features in the family should be unique. The same approach can be applied to cases of λ>2. An example of pulse signatures at two different nodes is illustrated in FIG. 6. An apparatus with a theoretical probability of error of zero can be achieved by ensuring that ω>nλ, where n is the number of signatures in the family. The design of the pulse signatures is discussed in further details below.

In the example of FIG. 1, each sensor 113 only needs to indicate one state of detection in its sensory signal 113a upon pressure detection. Accordingly, each sensor node 112 is correspondingly associated with one unique pulse signature 200 to indicate the state of detection, and the respective filter 132 is also associated with the corresponding unique pulse signature 200 to perform the needed correlation operation. As a result, with each pressure detection by the sensor 113, an indication pulse 400 of either polarity is generated to indicate the state of detection by the respective sensor 113. For this particular example, polarity of the indication pulse may not represent useful information. However, in other embodiments, the polarity may be relevant. For example, two pulse signatures 200 of the same pulse positions and different (e.g., opposite) pulse polarities may be used by each sensor node 112 to indicate respective two states in the corresponding sensory signal 113a. The polarity of each pulse, or "pulse polarity", means the potential of the pulse, either the positive voltage potential ("Vdd") or the negative voltage potential ("Vss"). For parallel correlation operations, the number of filters 132 should match the total number of unique pulse signatures 200 assigned to the sensor nodes 112.

It would be appreciated that the sensor nodes 112 may be associated with any other types of sensors 113, such as temperature sensors, which may be integrated with the respective sensor nodes. Further, the sensor nodes 112 may be associated with more than one types of sensors (e.g., pressure and temperature sensors). For example, in an electronic skin application, the sensors 113 include an array of fast-adapting (FA) pressure sensors, slow-adapting (SA) pressure sensors and temperature sensors. Together, these sensors 113 may be configured to mimic the biological counterparts.

The FA sensors 113 are configured to respond only to dynamic deformation of the conductive fabric 111 and to be insensitive to static forces. Each FA sensor 113 is configured to indicate a first state of pressure increase and a second state of press decrease in its sensory signal 113a. That is to say, for each FA sensor 113, the sensory signal 113a generated by the FA sensor 113 has the first and second states. The corresponding sensor node 112 of each FA sensor 113 is associated with first and second unique pulse signatures 200 to indicate the first and second states of the sensory signal 113a, respectively. Specifically, with the firmware of the sensor node 112 configured to recognise the corresponding FA sensor 113, the firmware model in the sensor node 112 for the FA behaviour causes the microcontroller 116 to generate and transmit the first and second unique pulse signatures 200 according to the state of the corresponding sensory signal 113a. Each sensor node 112 is triggered, upon receipt of the corresponding sensory signal 113a in the first state, to transmit the associated first unique pulse signature 200, and upon receipt of the corresponding sensory signal 113a in the second state, to transmit the associated second unique pulse signature 200 independently through the transmission medium. More specifically, in one particular example, the microcontroller 116 is caused by the firmware model to generate and transmit the first unique pulse signature 200 for each increment of more than 50 mV detected in the corresponding sensory signal 113a, and to generate and transmit the second unique pulse signature 200 for each decrement of more than 50 mV detected in the corresponding sensory signal 113a. With such a configuration, the sensor node 112 of each FA sensor 113 is able to indicate to the receiver 130 the state of the sensory signal 113a (increase and decrease of pressure). Moreover, as discussed above, the first and second unique pulse signatures 200 of each sensor node 112 may have different (e.g., opposite) pulse polarities. That is to say, the first and second pulse signatures 200 may have the same pulse positions but opposite pulse polarities (i.e., voltage potentials). In other embodiments, the first and second signatures 200 may be partially or completely different in terms of, for example, pulse position, pulse duration, inter-pulse duration, pulse polarity, the number of pulses, or a combination thereof. Contrary to the biological counterparts which do not distinguish between pressure increase and pressure decrease, the arrangement of the FA sensors 113 and the respective sensor nodes 112 can meet a wide range of temporal response requirements, from precise pressure or force measurements to transient tactile stimulus detection. Each sensor node 112 may, in other arrangements, be associated with a sensor 113 of any type, and be associated with unique pulse signatures corresponding in number to states of the sensory signal 113a generated by the sensor 113.

The SA sensors 113 are further configured to respond to static pressure and to be insensitive to dynamic deformation of the conductive fabric 111. Each SA sensor 113 is configured to indicate a current value of static pressure in its sensory signal 113a, and the corresponding sensor node 112 transmits the corresponding signature 200 at a frequency dependent on the current value. In this embodiment, the signature transmission frequency is in a positive relative to the current value of detected static pressure in the sensory signal 113a. That is, the higher the current value of detected pressure, the shorter the interval between two corresponding consecutive signature transmissions. In particular, the firmware model for SA behaviour causes the microcontroller 116 to generate and transmit multiple instances of the respective unique pulse signature 200 with an interval proportional to the 8 point averaged ADC digital value. For FIGS. 11A, 11B and 14B, the interval is the sum of 1 ms and a product of 100 μs and the converted digital value in decimal. For example, to represent a value of 500, two consecutive signatures are transmitted with an interval of 51 ms (500×100 μs+1 ms). Together with a 1 ms pulse signature duration, a maximum ADC value of 1023 will correspond to a 103.3 ms interval between two consecutive signatures. The sensor node 112 of each SA sensor 113 needs to be associated with one unique pulse signature 200 to indicate a current value of detected pressure in its sensory signal. To indicate the current value, the associated sensor node 112 is configured to, having transmitted a previous one of an assigned unique pulse signature 200, transmit a current one of the same unique pulse signature 200 to indicate the current value of detected static pressure by the interval between the transmitted current and previous ones of the assigned signature 200. Upon initiation where the sensor node 112 has not transmitted the assigned signature 200 in association with a stimulus event, the sensor node 112 may indicate a first value of detected pressure by consecutively transmitting two instances of the corresponding signature 200 with an interval corresponding to the first value. Any subsequent values of detected static pressure may be indicated by the sensor node 112 in the manner described above. Each sensor node 112 may, in other arrangements, be associated with a sensor 113 of any type, and be configured to transmit consecutive instances of an associated unique pulse signature 200 to indicate, by a corresponding interval between current and previous ones of the associated unique pulse signature 200, a current value of the sensory signal 113a generated by the sensor 113.

Figure 11A:
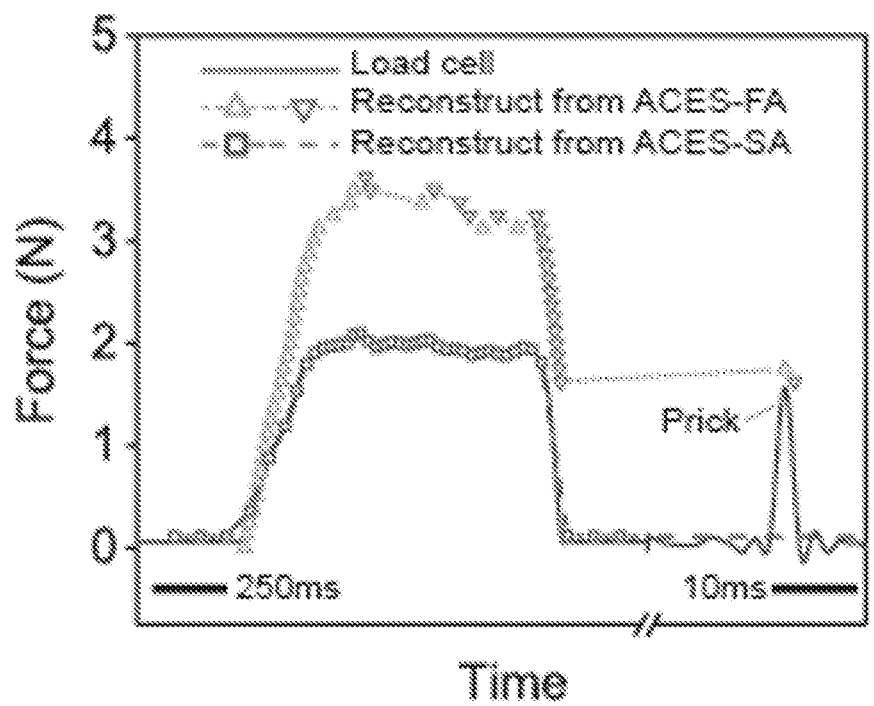
FIG. 11A is plot of pressures sensed by a fast adapting sensor and a slow adapting sensor in relation to a load cell over time, obtained using another embodiment of the apparatus of the present disclosure.
Figure 11B:
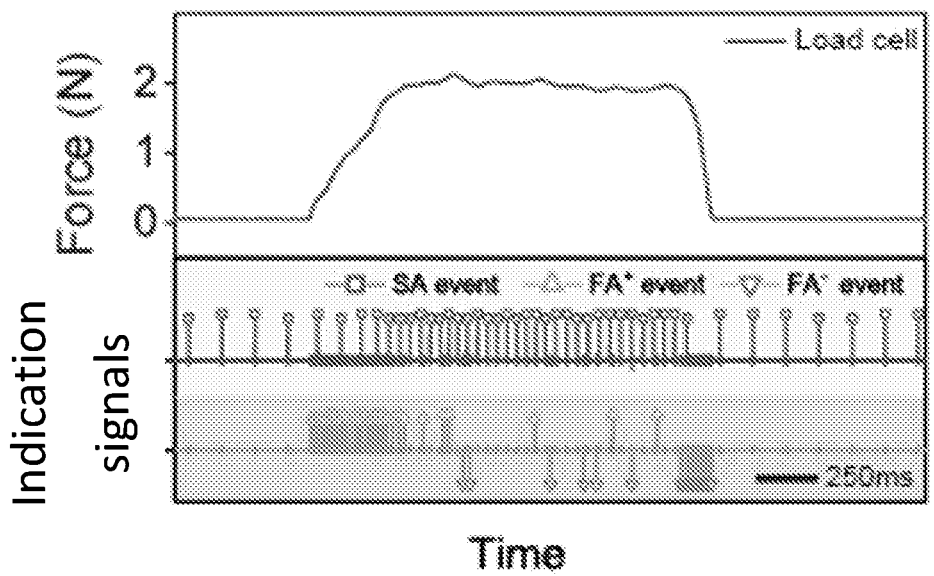
FIG. 11B is a plot of each instance of pressure detection by the fast adapting sensor and the slow adapting sensor in relation to the load cell over time, obtained using the embodiment of FIG. 11A for a shorter period.

It is worth noting that each sensor node 112 is, in the example of FIGS. 11A and 11B, configured by way of firmware to recognise and be associated with the respective sensor 113. That is, the sensor node 112 chooses a mode of operation based on the type or configuration of the associated sensor 113 (SA or FA). Whilst the FA and SA sensors 112 are described to be different types of sensors, they may be implemented using the same component (e.g., a piezoresistive element). In such a case, whether the sensor 112 is to function or be treated as an FA sensor or an SA sensor can be determined by the firmware of the respective sensor node 113.

In another embodiment, each sensor node 112 is configured to transmit another associated unique pulse signature 200 independently through the transmission medium to indicate an internal state of the respective sensor node. For example, the sensor node 112 may be associated with one or more additional unique pulse signatures for each additional internal state to be reported.

FIG. 11A shows a plot of dynamic force increases and decreases sensed by one of the FA sensors 113 in relation to a load cell over time, and a plot of static forces detected by one of the SA sensors 113 against the load cell over time, obtained based on the corresponding indication signals 400 shown in FIG. 11B. For the FA sensor 113, the detected states of force increase and force decrease are marked by opposite respective triangular symbols. For the SA sensor 113, the values of detected static force are marked by respective square symbols. In the example of FIGS. 11A and 11B, the SA sensors 113 can accurately detect static force and indicate the respective detected values in their respective sensory signals 113a. The FA sensors 113 can accurately detect dynamic force and indicate the detected states of force increase and force decrease in their sensory signals 113a. This is demonstrated in FIG. 11A, where the FA sensor 113 successfully detects force changes associated with a prick from a lancet lasting about 1 ms. The SA sensor 113 in this embodiment is not sensitive enough to detect the prick because the duration of the prick of 1 MS is well below the corresponding interval for indication of the force intensity. Both the SA and FA sensors 113 successfully detect a finger press taking place prior to the prick, as shown in FIGS. 11A and 11B. The readings of the load cell are smoothed using a moving average filter of 8 points (OriginLab 2017). It should be noted that the term "force" as used in this context may be interpreted to include "pressure".

Figure 12A:
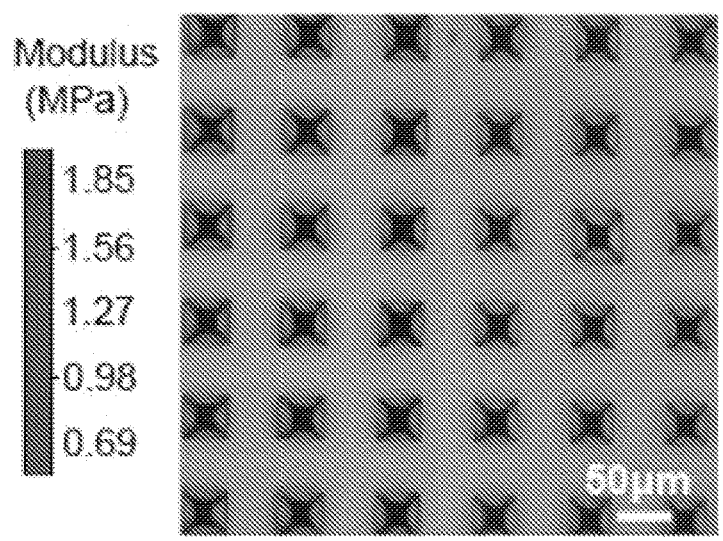
FIGS. 12A and 12C show photographic representations of flexible pressure sensors implemented with heterogeneous transduction profiles developed by altering the Young's modulus of elastomers used to construct the micro-pyramidal piezo-resistive sensors.
Figure 12B:
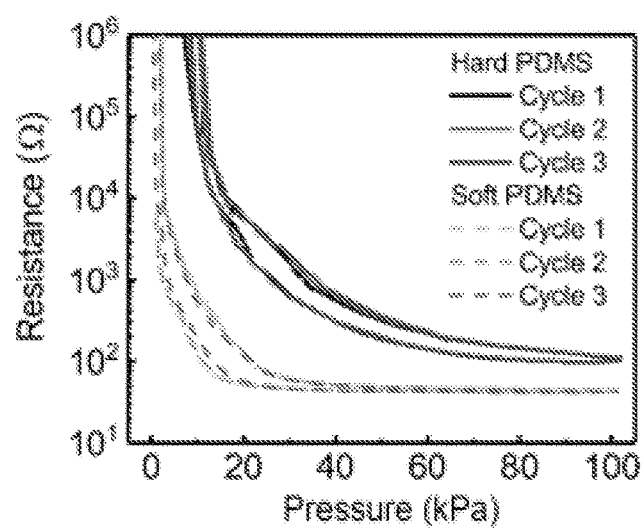
FIG. 12B shows a plot of resistance versus pressure in relation to FIGS. 12A and 12C.
Figure 12C:
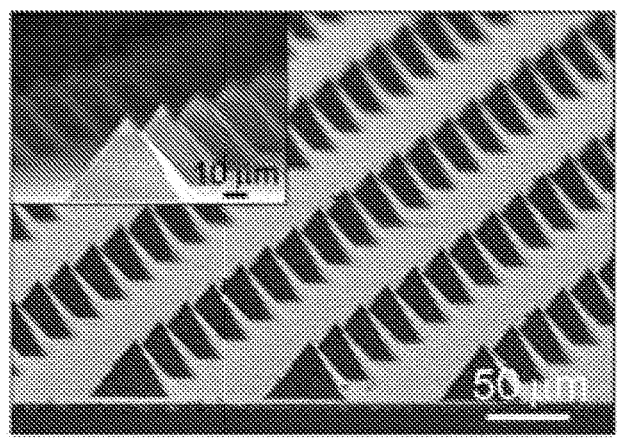

FIGS. 12A and 12C show photographic representations of flexible pressure sensors implemented with heterogeneous transduction profiles developed by altering the Young's modulus of elastomers used to construct the micro-pyramidal piezo-resistive sensors. FIG. 12B shows a plot of resistance values versus pressures. This allows sensors of various tactile sensitivities to be distributed spatially on the same substrate (i.e., the conductive fabric 111). With such a construction, the sensors can be made to be sensitive to both light touches and higher loads without saturation. The wide dynamic pressure range enables continued pressure detection under typical manipulation forces when gripping an object.

Figure 13A:
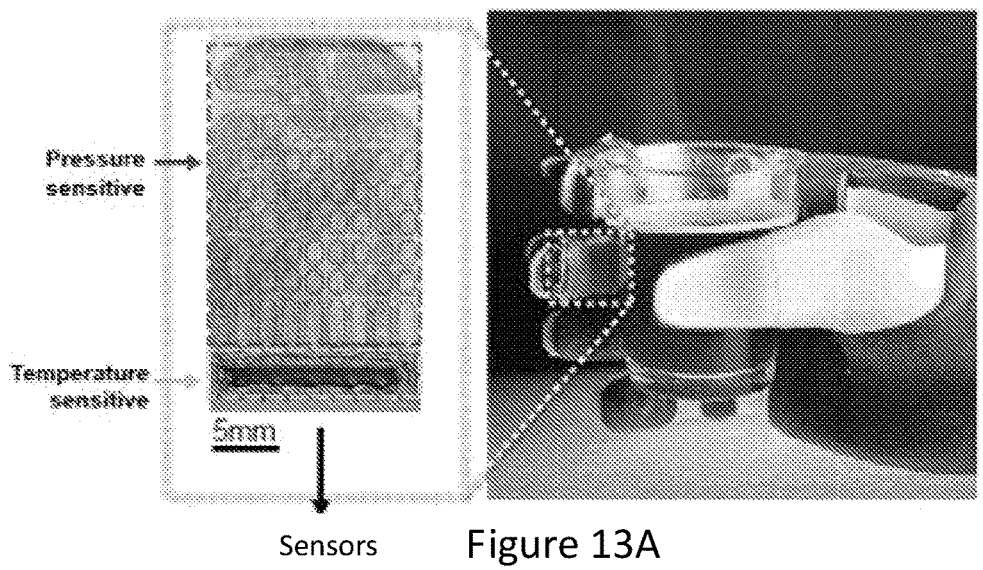
FIG. 13A shows a photographic representation of an array of pressure and temperature sensors on a robotic effector in the shape of a human hand in association with a cup of hot liquid, according to another embodiment of the apparatus of the present disclosure.
Figure 13B:
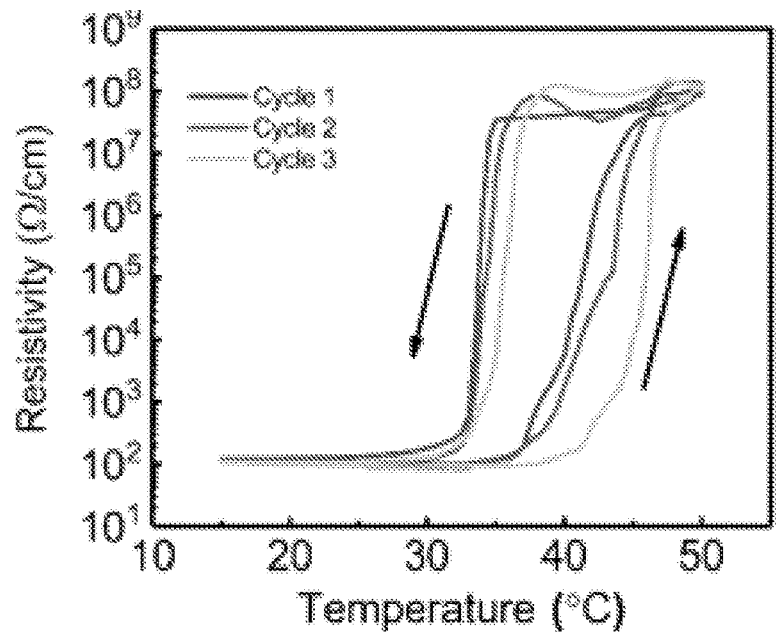
FIG. 13B shows a plot of resistivity versus temperature obtained using the temperature sensors of FIG. 13A.
Figure 13C:
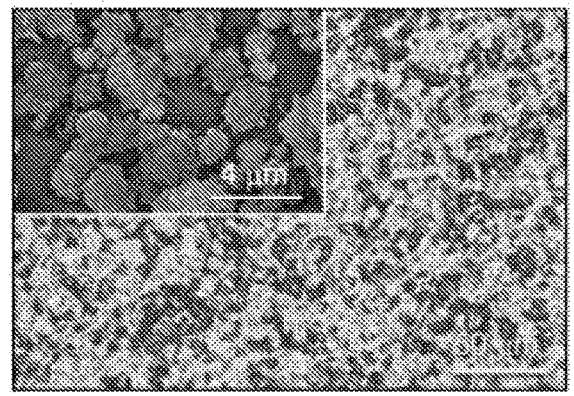
FIG. 13C shows an optical microscopic image of one of the temperature sensors of FIG. 13A.
Figure 13D:
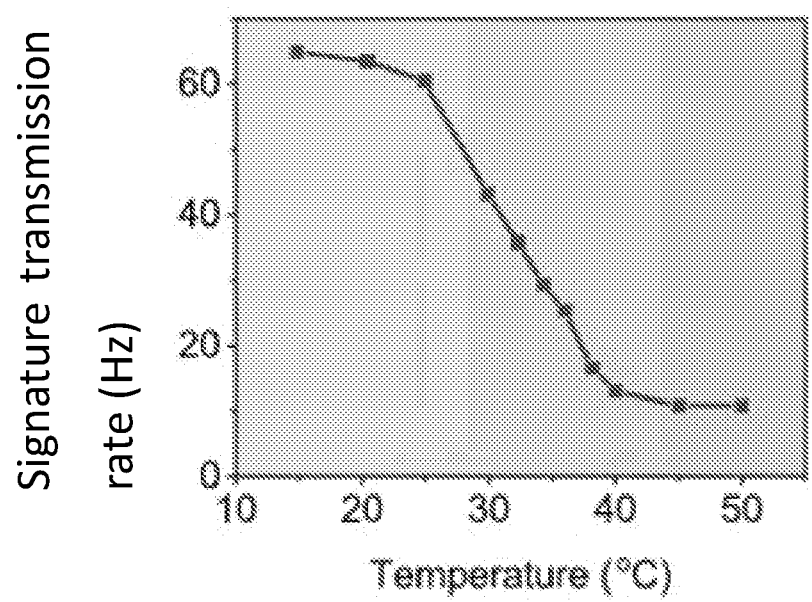
FIG. 13D shows a plot of signature transmission rate versus temperature of the temperature sensors of FIG. 13A.
Figure 13E:
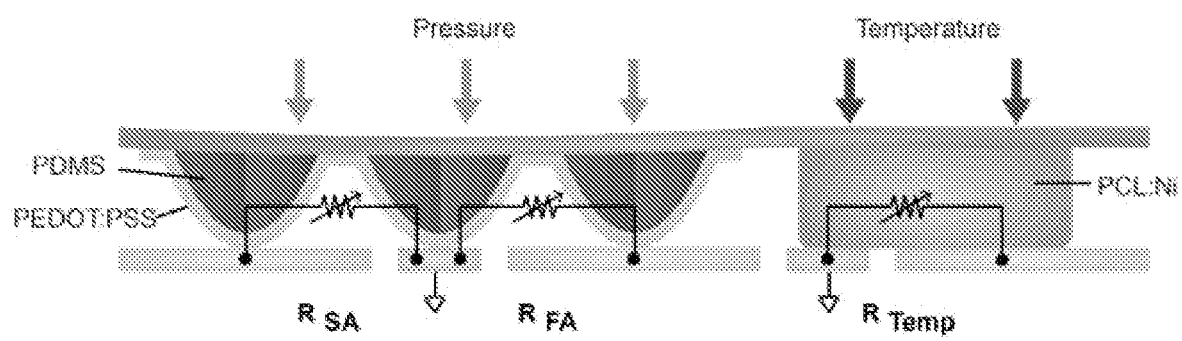
FIG. 13E shows of an arrangement of resistive pressure and temperature sensors on a single substrate.
Figure 14A:
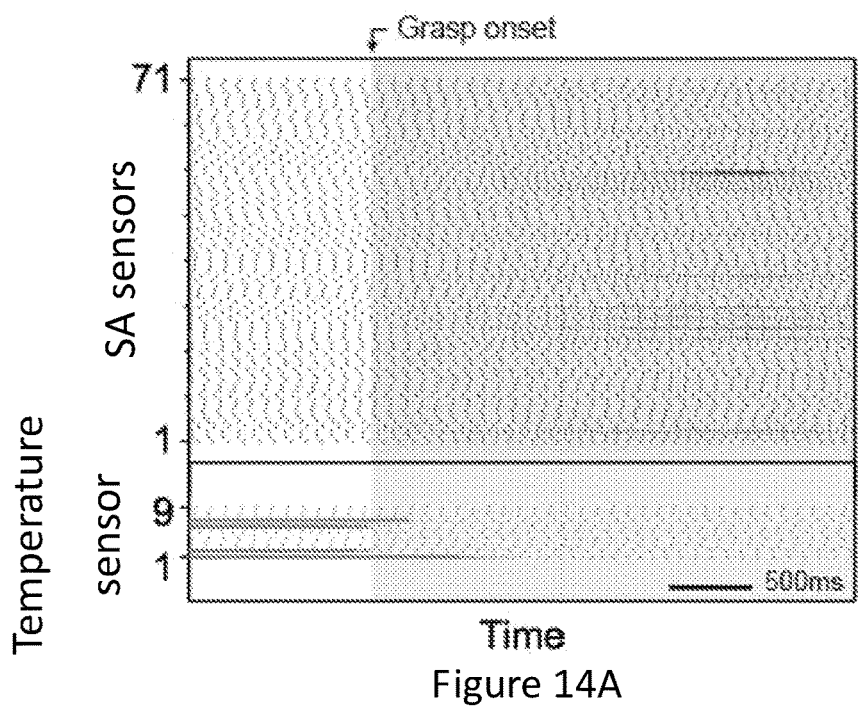
FIG. 14A shows a diagram of indication signals versus time, obtained in the application of FIG. 13A.
Figure 14B:
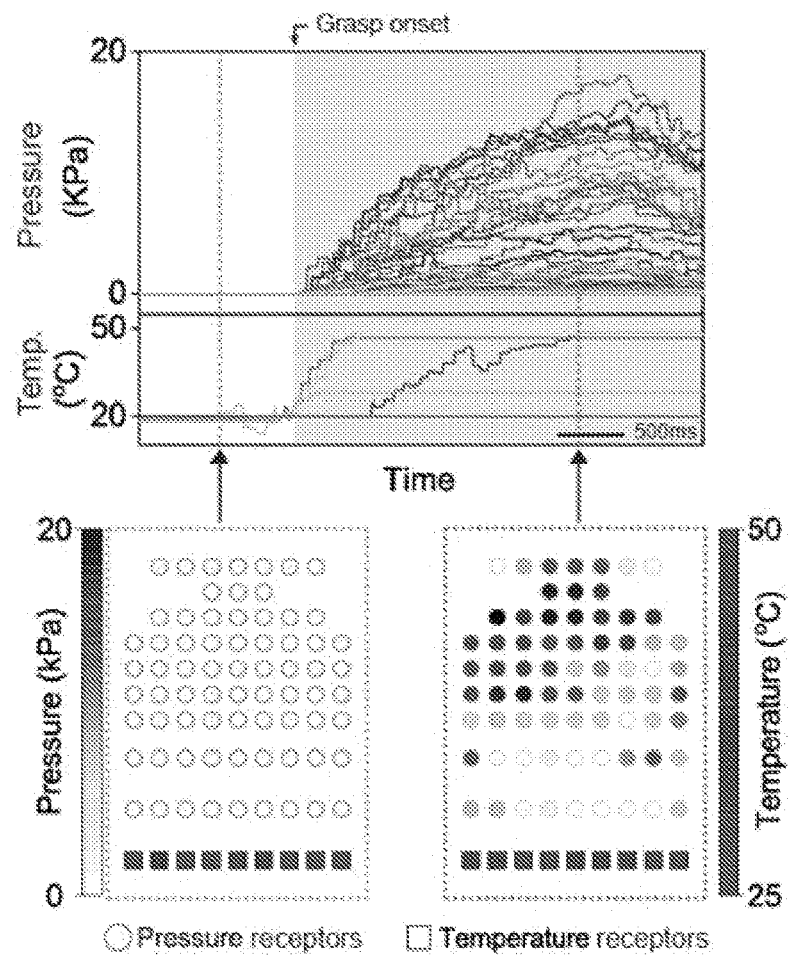
FIG. 14B shows a diagram of stimulus detection based on the indication signals shown in FIG. 14A.

FIG. 13A shows a photographic representation of an array of pressure and temperature sensors on a robotic effector in the shape of a human hand in association with a cup of hot liquid. FIG. 13B shows a plot of resistivity versus temperature obtained using the temperature sensors of FIG. 13A. FIG. 13C shows an optical microscopic image of one of the temperature sensors of FIG. 13A. The temperature sensors are flexible resistive sensors implemented on a single substrate (i.e. conductive fabric). The temperature sensor is designed to have a main sensitivity range from 20° C. to 50° C., which similar to the cold receptor afferents in human skin. The associated sensor node transmits the unique pulse signature at a reduced frequency (i.e., increased interval) as the detected temperature rises above 25° C. (see FIG. 13D). FIG. 13E shows an example arrangement of resistive pressure and temperature sensors on a single substrate (i.e., conductive fabric). FIGS. 14A and 14B show diagrams in relation to the application of FIG. 13A (holding a cup containing hot liquid). FIG. 14A shows a diagram of indication signals versus time obtained from pulse signatures transmitted by the temperature and pressure (SA) sensors. FIG. 14B shows a diagram of stimulation detection based on the indications signals shown in FIG. 14A. It can be seen from these figures that simultaneous or near simultaneous detection of tactile and thermal stimuli by the SA and temperature sensors can be achieved.

Figure 15A:
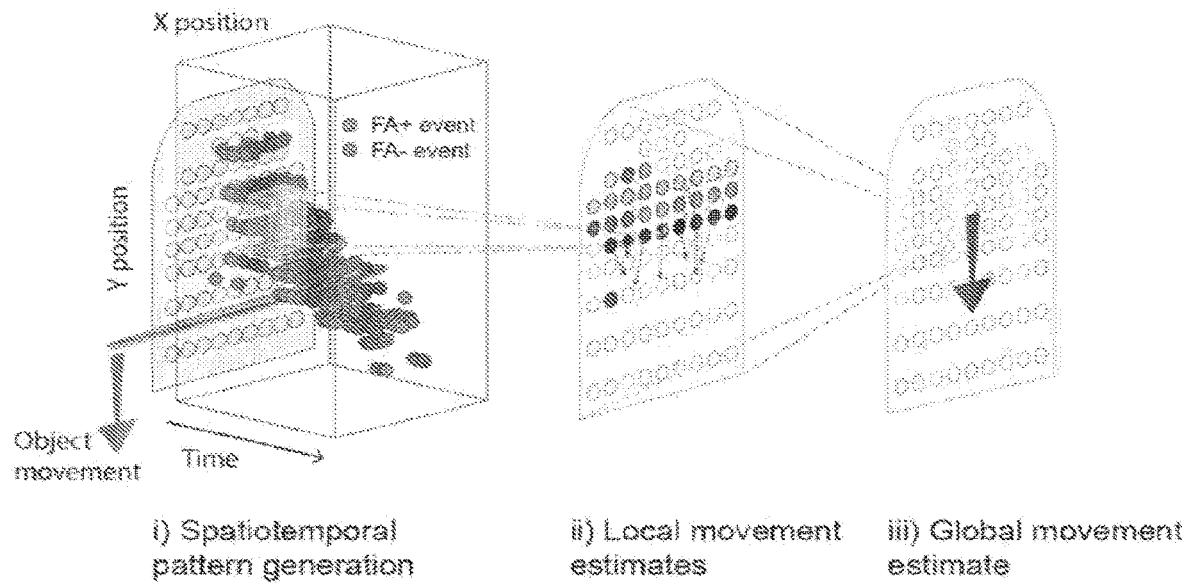
FIG. 15A shows a spatiotemporal representation or pattern of tactile stimulus detection by fast adapting sensors, obtained using another embodiment of the apparatus of the present disclosure.

In another application, the FA sensors 113 can be employed by, for example, a robotic effector to detect slippage of an object held by the effector. FIG. 15A (part i) shows a spatiotemporal representation or pattern of tactile stimuli detected by the FA sensors 113 over time, with the FA sensors 113 provided on the effector. A spiking convolutional network is implemented to compute the magnitude and direction of slippage in an event-driven manner. As slippage of the object starts to occur, stimulus detection by the FA sensors 113 triggers the computation of movement to estimate the onset of slippage.

Figure 15B:
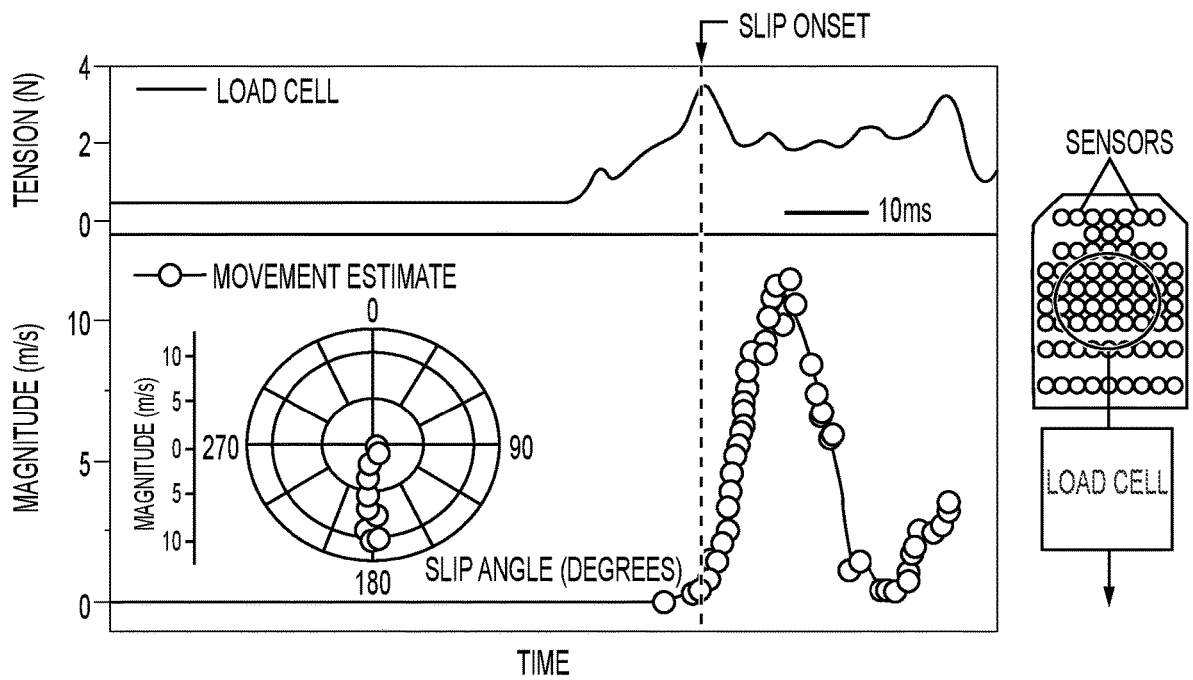
FIGS. 15B and 15C show diagrams of slip detection of different objects, using the apparatus of FIG. 15A.
Figure 15C:
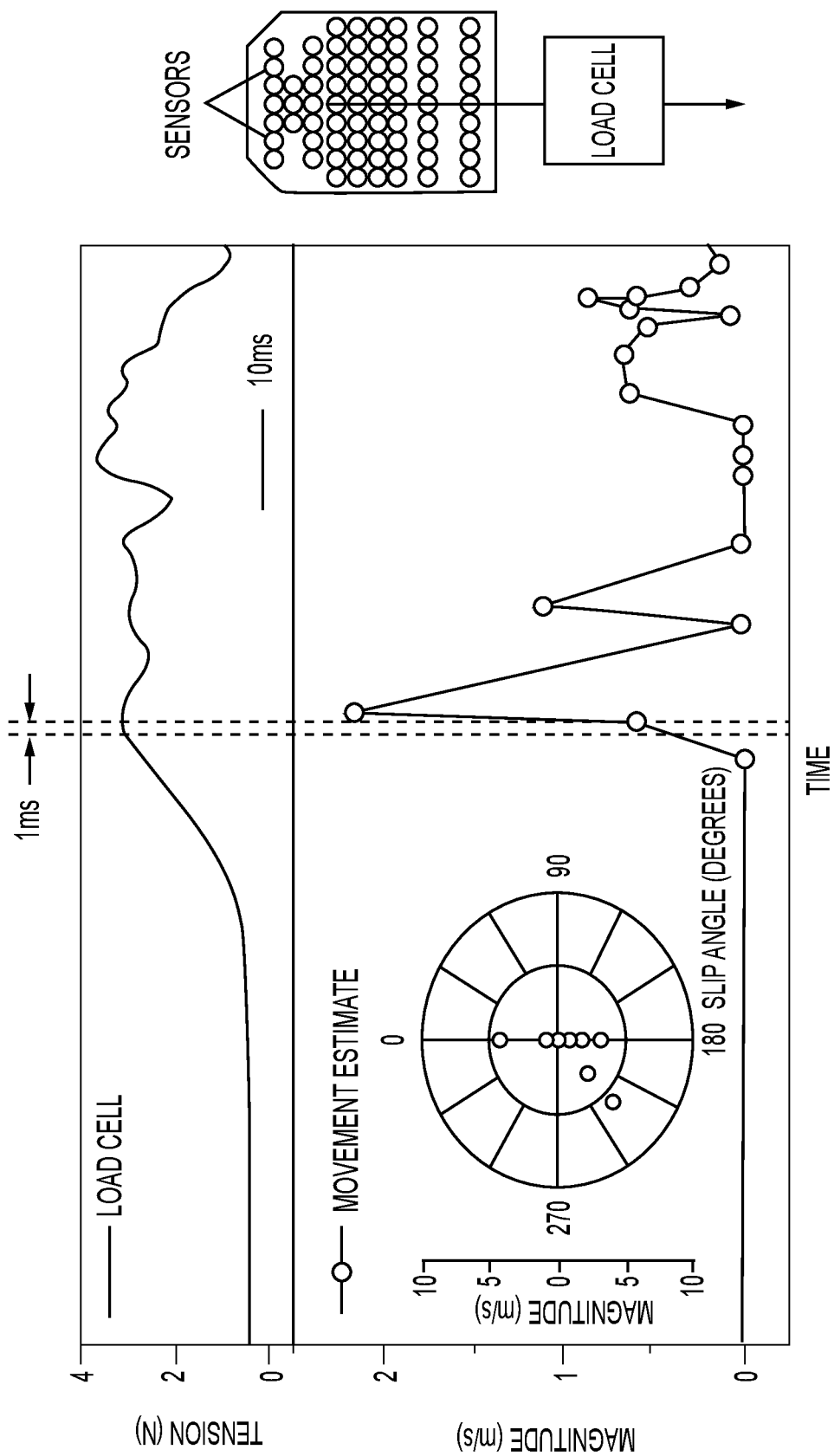

Referring to FIG. 15B, movement estimates can be calculated immediately upon slippage onset, and the downward movement of the object can be accurately identified. FIG. 15C shows that the same implementation can be used to detect the slippage of a needle with 1 ms of latency. However, the directional estimates show higher deviations due to the smaller number of stimulated FA sensors 112 and the reduced contact area. Higher sensor densities are thus required for dextrous manipulation tasks of varying object form factor.

Specifically, in the experiments of FIGS. 15A, 15B and 15C, an acrylic disk of 1 cm diameter and a needle of 0.8 mm diameter is held respectively and vertically between two flat opposing surfaces of a bench vice. An array of 80 pressure sensors (similar to the one in FIG. 14A but without the thermal sensors), are arranged to interface with a corresponding array of sensor nodes mimicking FA behaviour. The sensors are pasted on one of the surfaces of the vice. A thread connects the object to a load cell. A separate thread is connected to the opposite side of the load cell and adapted to be pulled to cause slippage of the object from the vice. Data generated by the 80 sensor nodes is sampled together with an analog output of the load cell at 125 MHz using an oscilloscope (Picoscope 3406D). Computation of slip detection is processed offline in MATLAB.

The computation of local movement estimates (part ii, FIG. 15A) is generally as follows:
1. For an event from a particular sensor A that occurred at $t_0$, look for prior events from sensor within distance D of sensor A that occurred at $t_{prior}$ where $t_0 - \Delta t < t_{prior} < t_0$;
2. For each prior event, compute movement magnitude $$\text{Magnitude} = \frac{D}{t_0 - t_{prior}};$$

3. Movement direction for each prior event direction=$a \tan 2(d_y, d_x)$ where $d_x$ and $d_y$ are the x and y components of the distance D; and
4. By averaging the magnitude and direction for each prior event, the local movement estimate at sensor A's location is obtained.

The global movement estimate (part iii, FIG. 15A) is obtained as the moving average (exponential kernel of 5 ms time constant) for all the local movement estimates. For FIGS. 15B and 15C, $\Delta t$=5 ms and D=2 mm.

Figure 16A:
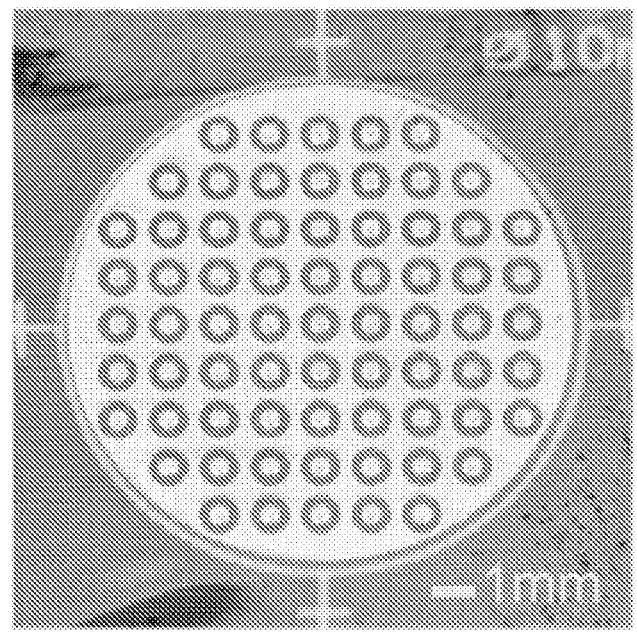
FIG. 16A shows another arrangement with 69 fast adapting sensors in an experiment of object feature classification.
Figure 16B:
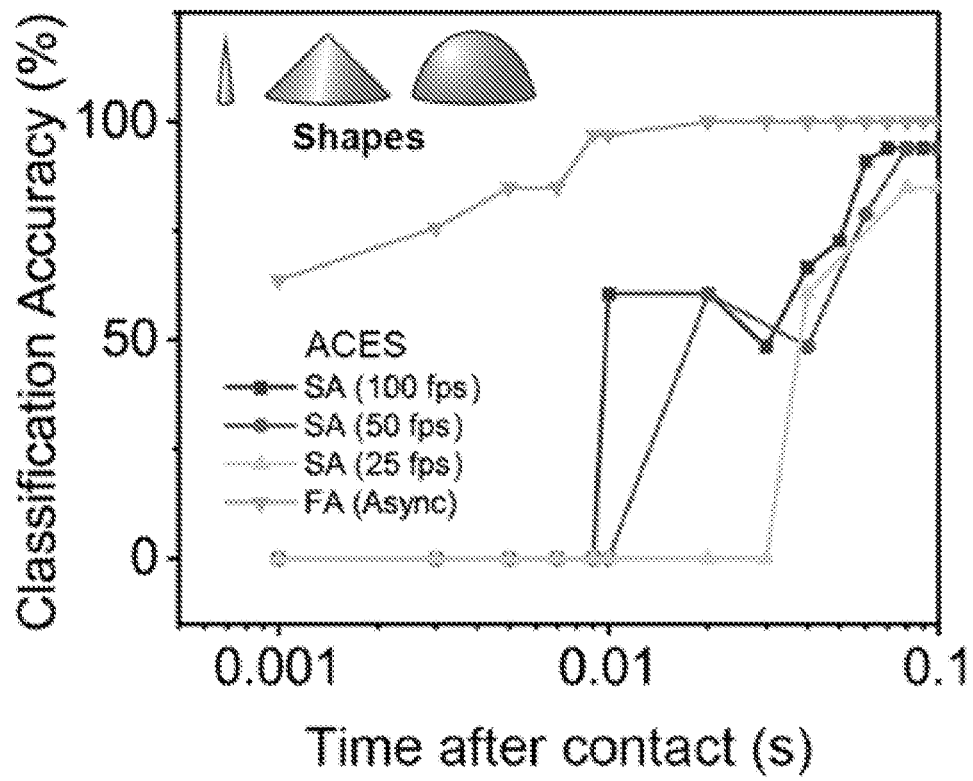
FIG. 16B shows a result of the experiment of FIG. 16A, comparing performance of the fast adapting sensors with that of slow adapting sensors in local curvature classification.

FIGS. 16A and 16B show another application where an array of 69 FA sensors mimic Meissner corpuscle responses. It can be appreciated that various local curvatures can be classified up to 10 times faster (within 7 ms with a 97% accuracy) than possible with a 100 frame-per-second (fps) conventional sensor array.

Figure 17A:
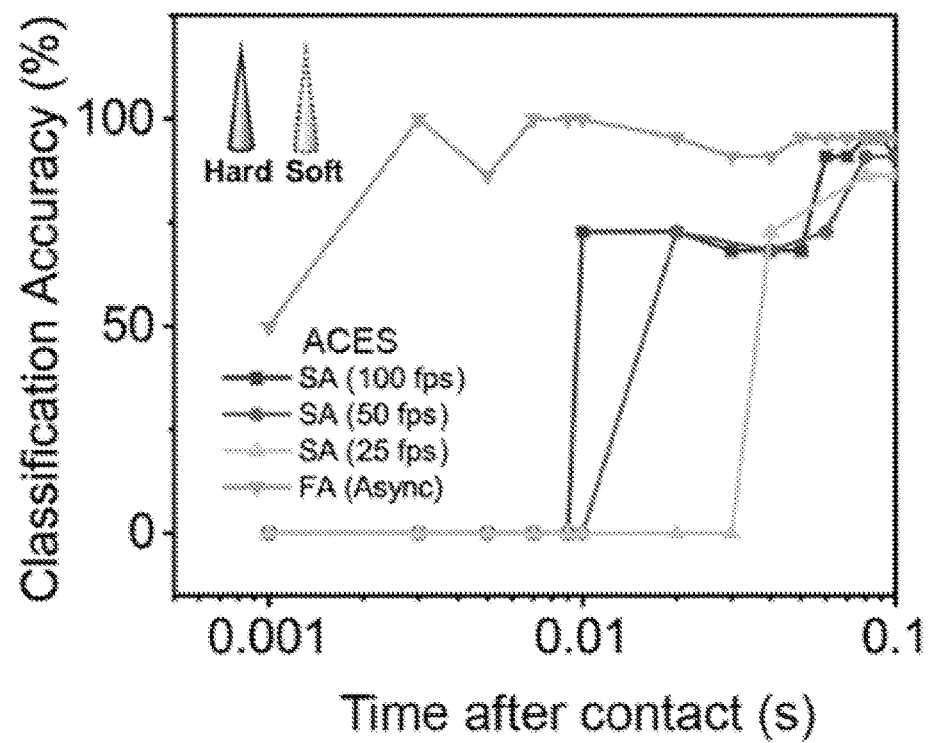
FIGS. 17A to 17C show respective diagrams of classification accuracy for respective objects of identical geometrical features and different hardness values, in another application of the fast adapting sensors of FIG. 16A.
Figure 17B:
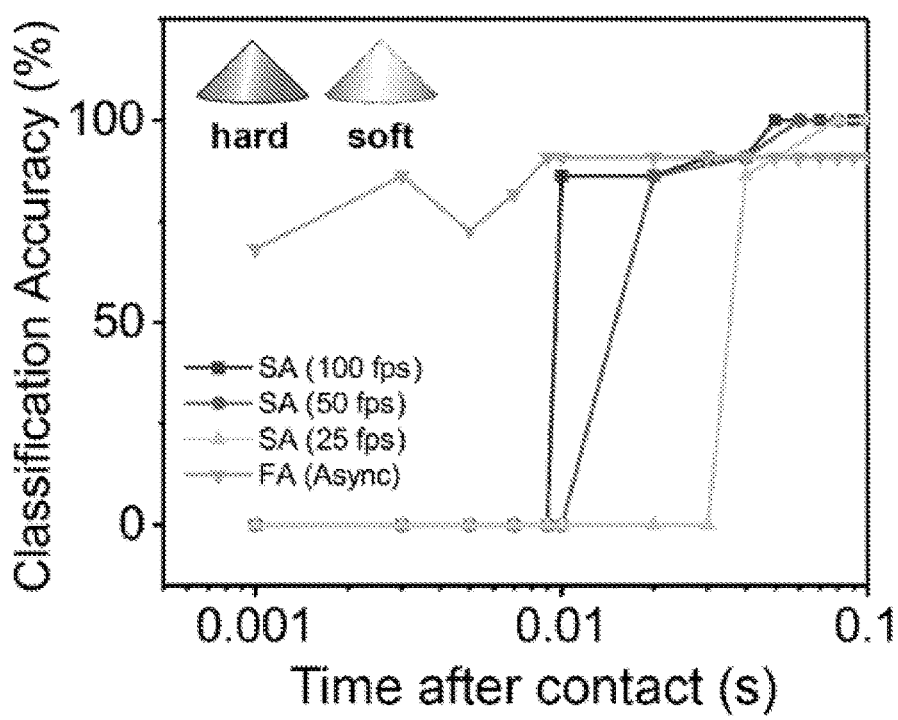
Figure 17C:
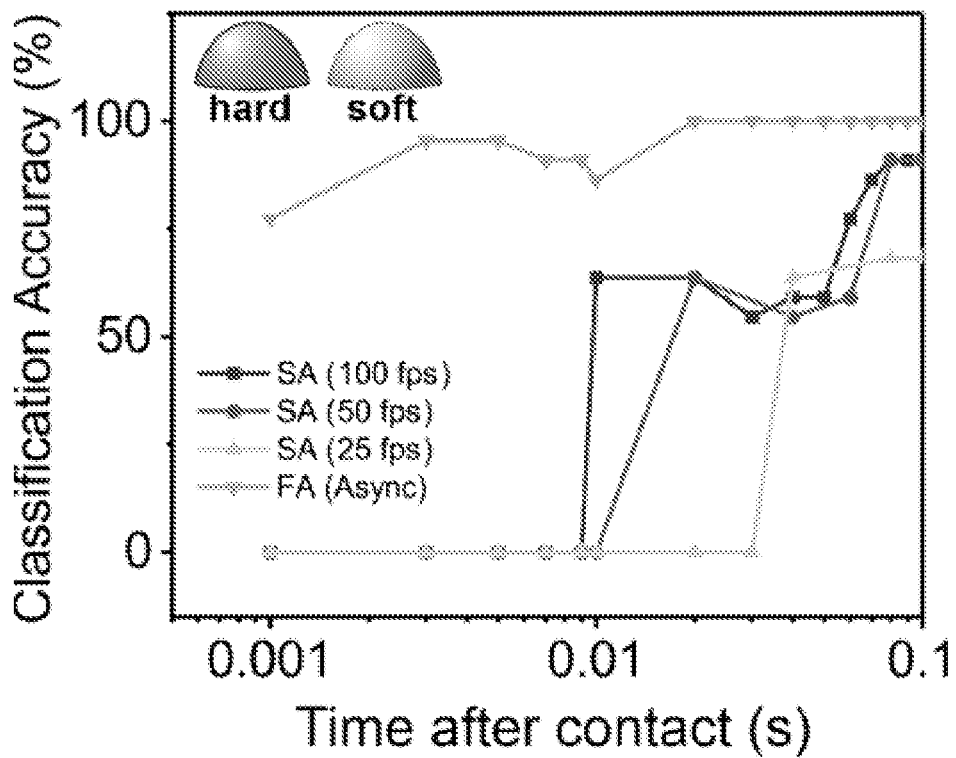
Figure 17D:
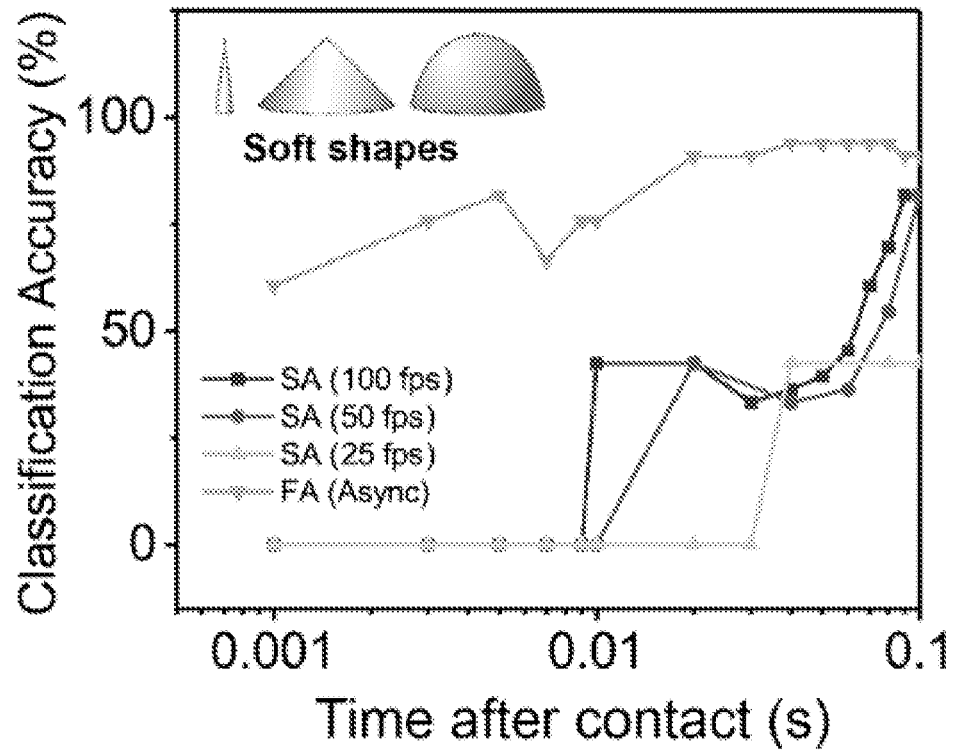
FIG. 17D shows a diagram of classification accuracy for soft objects of different geometrical features.

Each of FIGS. 17A to 17C shows a diagram of classification accuracy for two objects of identical geometrical features and different hardness, in another application of the FA sensors of FIG. 16A. FIG. 17D shows a diagram of classification accuracy for soft objects of different geometrical features of the same hardness. The results demonstrate the importance and effectiveness of temporal features in rapid tactile discrimination.

Figure 18A:
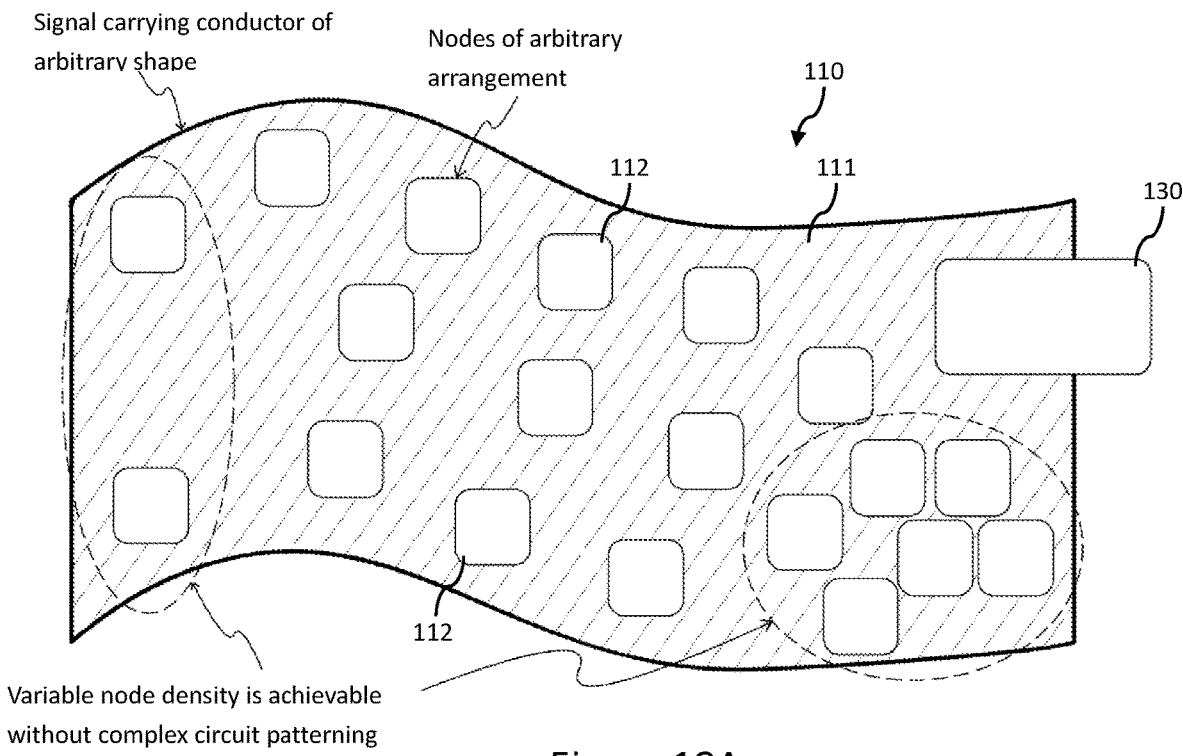
FIGS. 18A and 18B show a conductive fabric of the apparatus of FIG. 1 in intact and damaged states, respectively.
Figure 18B:
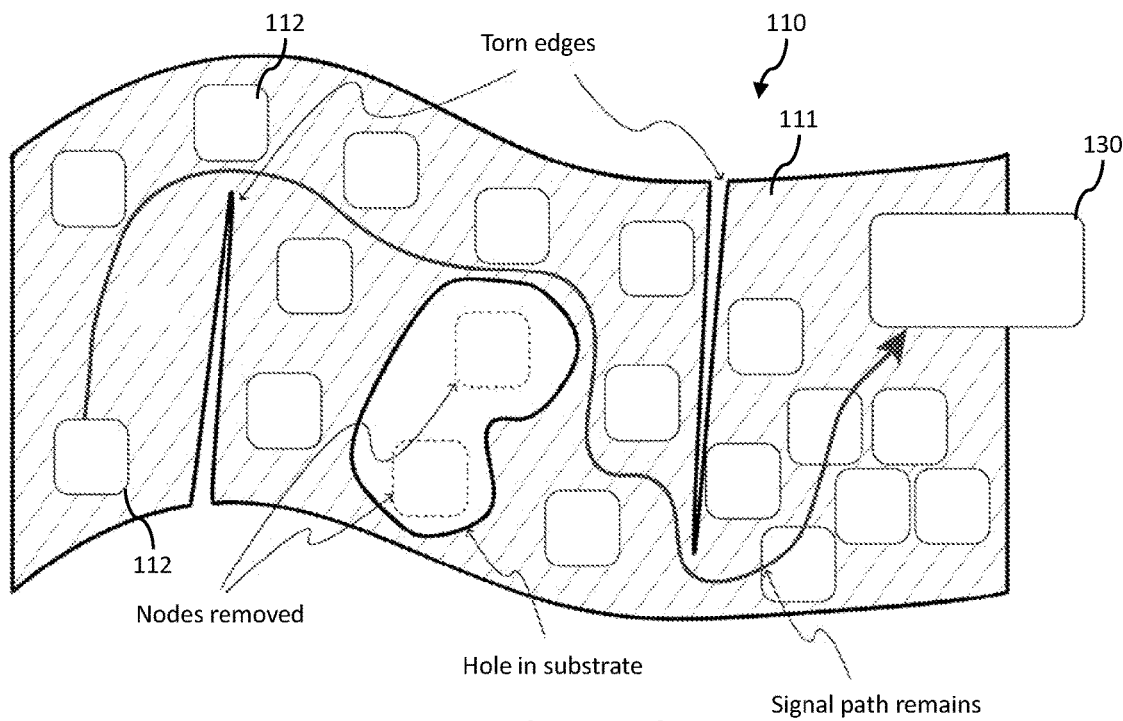

FIGS. 18A and 18B show the conductive fabric (or conductive substrate) 111 of the communication medium 110 in intact and damaged states, respectively. It can be seen that signal communication of the sensor nodes 112 through the conductive fabric 111 remains unaffected despite two tears formed in the conductive fabric 111 (labelled as "Torn edges" in FIG. 18B). A signal conducting path between the receiver 130 and a most distal one of the sensor nodes 112 is shown (marked as "Signal path remains"). Also shown in FIG. 18B is a removed portion of the conductive fabric 111 (labelled as "Hole in substrate"). Two of the sensor nodes 112 (marked by respective dashed squares and labelled as "Nodes removed") corresponding to the removed portion are removed altogether. A skilled person would appreciate that the conductive fabric 111 thus provides multiple signal conducting paths between the receiver 130 and each of the sensor nodes 112. Importantly, communication is adversely affected only if all signal conducting paths between the receiver 130 and the respective sensor node 112 are lost. That is to say, communication of a sensor node 112 in a portion of the conductive fabric 111 remains unaffected unless the portion of the conductive fabric 111 is completely torn apart or otherwise removed from the remaining portion of the conductive fabric 111. In most cases, a partial tear in the conductive fabric 111 would not adversely affect communication of the sensor nodes 112 via the conductive fabric 111. That is, signal communication between each of the sensor nodes 112 and the receiver 130 remains unaffected provided that the conductive fabric 111 can still provide at least one signal conducting path between the respective sensor node 112 and the receiver 130. Communication of the sensor node 112 is thus robust to damage (e.g., physical damage) of the conductive fabric 111.

In the example of FIGS. 18A and 18B, the conductive fabric 111 is made of a conductive polymer (e.g., PEDOT: PSS). However, in other embodiments, any conductive medium (e.g., conductive knitted wires, carbon based nanomaterials, metal nanowires, metal films, and metal wires) may be used in place of or in conjunction with the conductive fabric 111. The conductive fabric 111 of this example is electrically connected to the sensor nodes 112. It is to be emphasized that the conductive fabric 111 is just one possible form of the conductive medium. Some other example forms are described below with reference to FIGS. 19 and 20. By virtue of the polymer configuration, the conductive fabric 111 provides (or can be considered to provide) multiple signal conducting paths for each of the sensor nodes 112 and, in this embodiment, also acts as a structural support to support the sensor nodes 112. The conductive fabric 111 is elastic and flexible, thus suitable for electronic skin applications. The conductive fabric 111 thus allows for a flexible arrangement of the sensor nodes 112, and signal communication is resistant to or unaffected by damage sustained by the conductive fabric 111. The sensor nodes 112 can be flexibly configured in terms of placements, density and distribution to meet various design and application requirements. The conductive fabric 111 is thus suitable for covering or providing, for example, a curved surface of a humanoid robot for sensing non-uniform features.

Figure 19A:
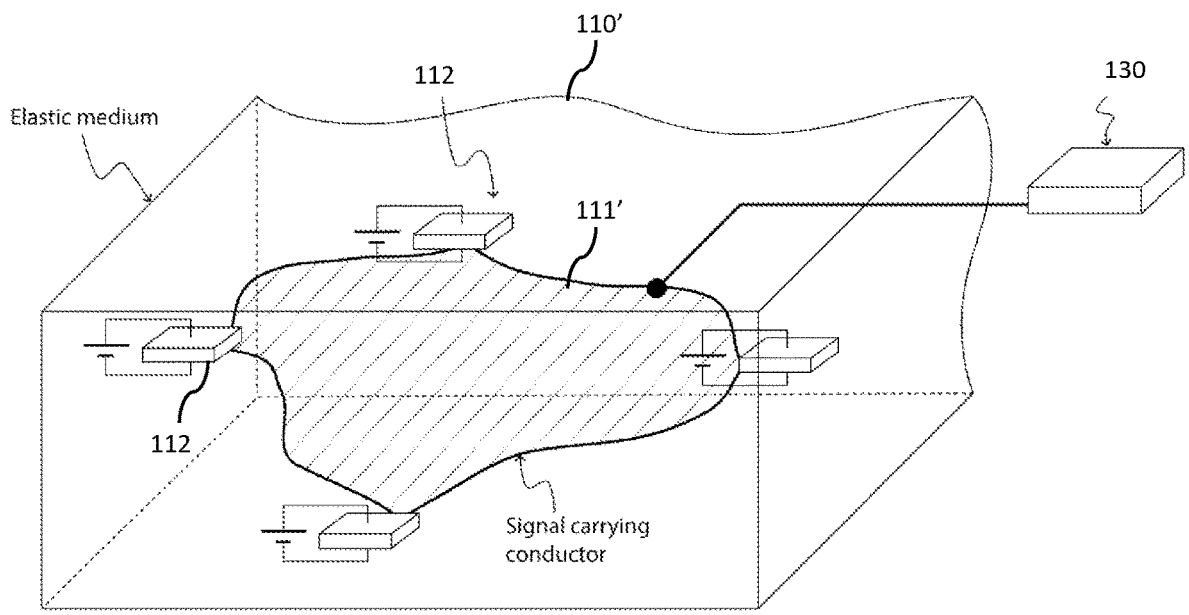
FIGS. 19A and 19B show a mesh/planar conductor portion in two alternative arrangements of the apparatus of the present disclosure, respectively.

FIG. 19A illustrates another communication medium 110' which is a variant of the communication medium 110. This communication medium 110' includes a mesh/planar conductor portion 111' associated with the sensor nodes 112. In this example, each sensor node 112 is powered by a respective power source (e.g., a battery). Communication between each sensor node 112 and the receiver 130 remain unaffected so long as at least one signal path exists therebetween. In addition, the mesh/planar conductor portion 111', if made to be elastic, are easier to realise in comparison with patterned wires (see FIGS. 20A and 20B). Similar to the polymer configuration of FIGS. 18A and 18B, the mesh/planar conductor portion 111' provides substantial redundancy in signal conducting paths between each sensor node 112 and the receiver 130.

Figure 19B:
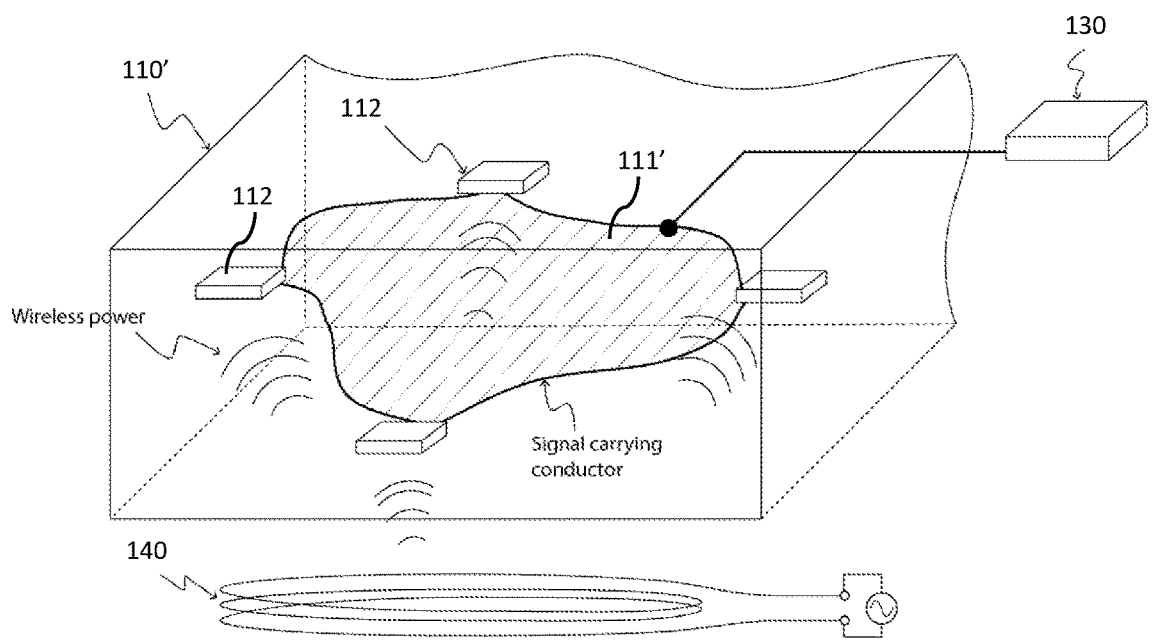

The sensor nodes 112 in the example of FIG. 19B wirelessly harvest power from a source 140 of electromagnetic waves (e.g., power transmission coils), which may be incorporated in an underlying rigid structure of, for example, a robotic/prosthetic body portion, enabling flexible distribution of the sensor nodes 112 along the mesh/planar conductor portion 111'. The sensor nodes 112 in other embodiments may also be configured to harvest power in a similar manner. In addition, other forms of power harvesting techniques (mechanical, solar, chemical, and thermal, etc) may also be employed to power the sensor nodes 112 wirelessly. The sensor nodes 112 may also be provided with respective power storage means (e.g., a rechargeable battery or a capacitive element) to store the harvested power.

Figure 20A:
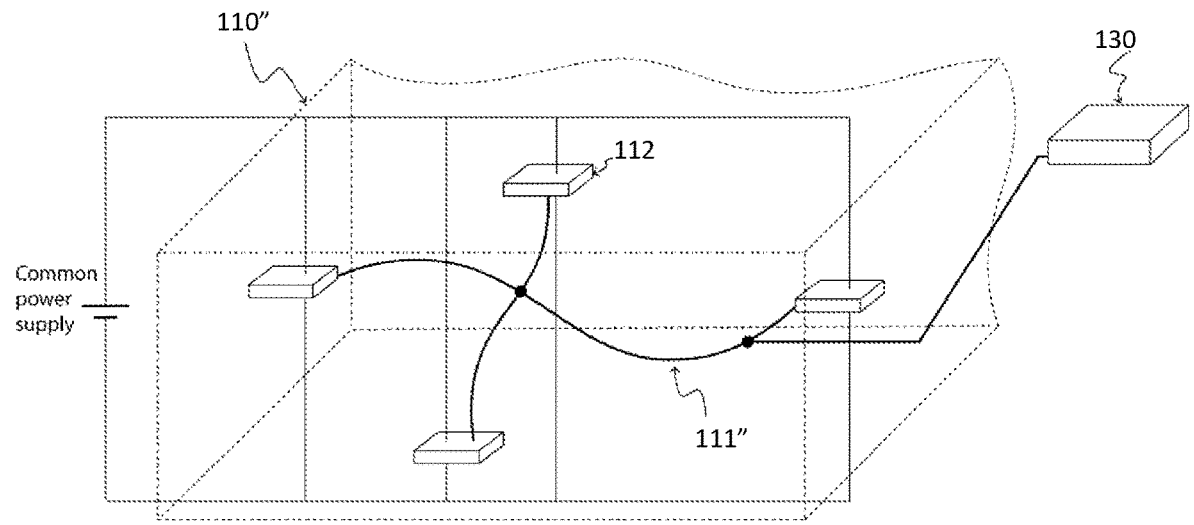
FIGS. 20A and 20B show patterned wires in two alternative arrangements of the apparatus of the present disclosure, respectively.
Figure 20B:
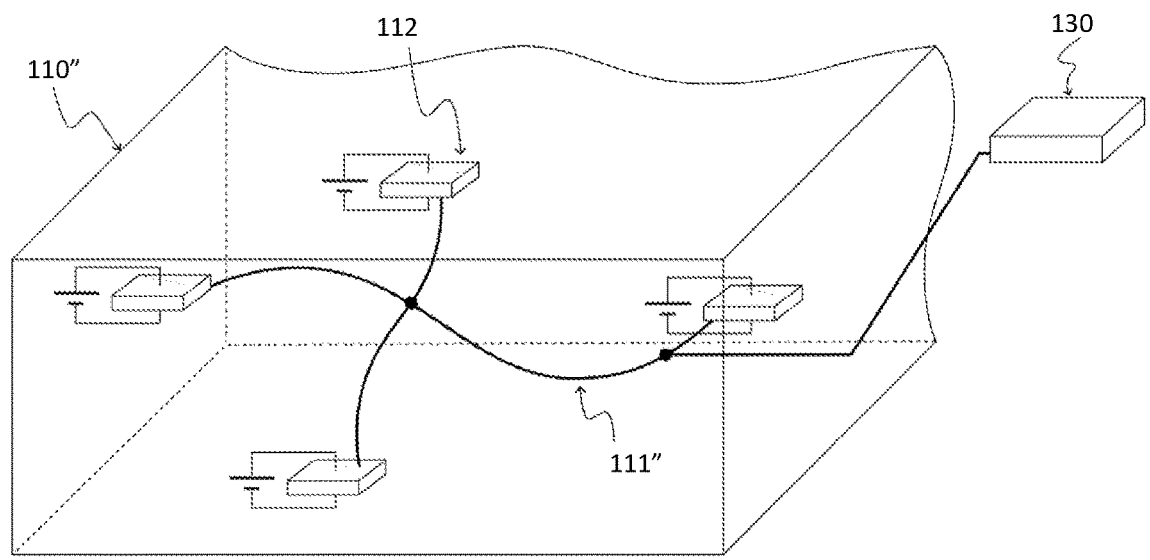

FIGS. 20A and 20B show two alternative embodiments of a basic setup of the communication medium 110" where sensor nodes 112 are embedded in elastomeric material. In the embodiment of FIG. 20A, the sensor nodes 112 are powered by a common power supply. Each of the sensor nodes 112 and the receiver 130 is connected by a respective conductor 111" (e.g., a wire) connecting to a common connection node. In such a configuration, each sensor node 112 requires only a single conductor 111" for communication. The configuration of FIG. 20B differs from that of FIG. 20A only in that each sensor node 112 is associated with a respective power source (e.g., a battery). Although this configuration of the conductor 111" reduces wiring complexity by virtue of the common connection node, it is not as robust as the configurations of FIGS. 18A to 19B in terms robustness of signal communication to damage.

It should be appreciated that, in other embodiments, the conductive medium may include at least one of a conductive fabric, a conductive bulk conductor, a conductive substrate, a conductive solid, a conductive gel, and a conductive fluid. An example of conductive fluid is Galinstan, a liquid metal made from gallium, indium and tin. It is possible to construct a mesh of micro-fluidic channels in a stretchable polymer and fill it with Galinstan to achieve a highly flexible/stretchable substrate.

Figure 21:
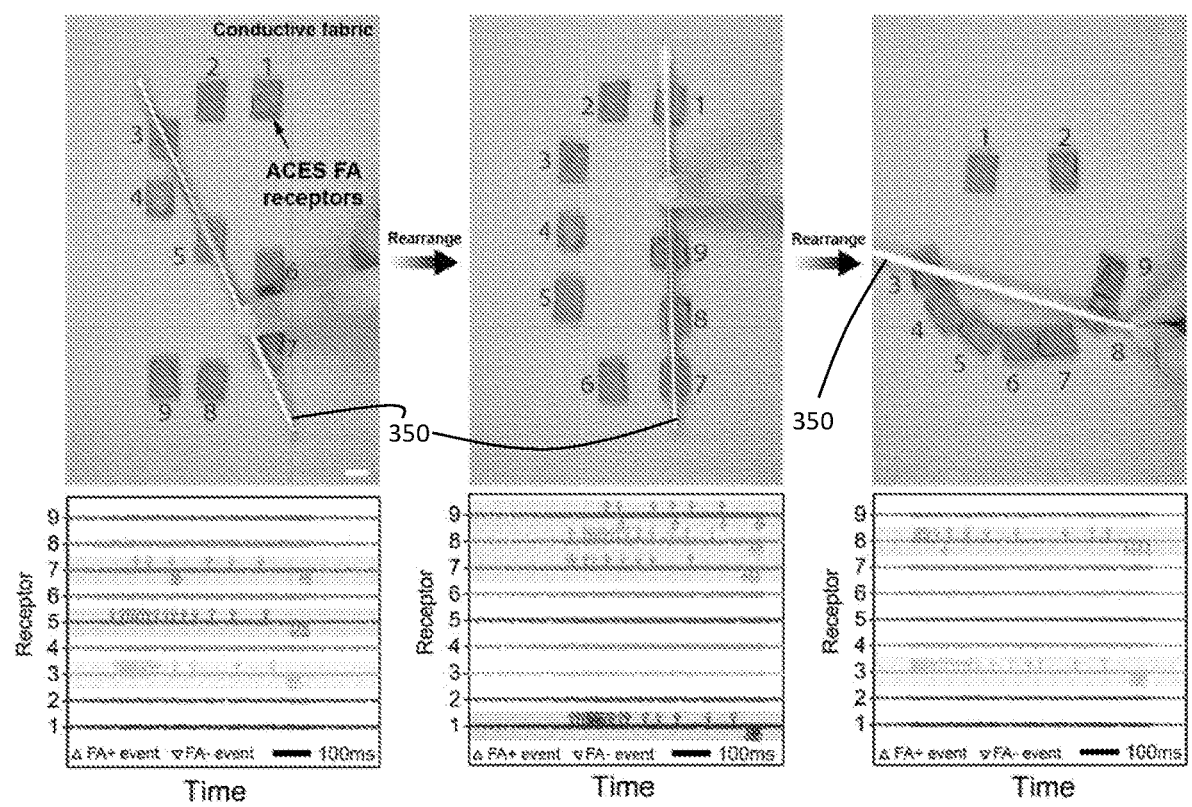
FIG. 21 shows nine sensor nodes with respective integrated fast adapting sensors in three different spatial formations.

Wiring simplicity in certain applications (e.g., e-skin) is critical, especially when wires are to be routed along non-uniform surfaces or curvatures. FIG. 21 shows nine sensor nodes with respective integrated FA sensors in three different spatial formations, placed on a conductive fabric (knit jersey conductive fabric, Adafruit) and powered by respective internal batteries. In each of the irregular formations, the FA sensors can accurately detect respective stimuli, allowing a spatiotemporal representation to be obtained and demonstrating the ability of the sensor nodes to be used in environments of non-uniform or uneven geometries. In particular, to apply pressure, a conductive rod 350 is pressed against some of the sensors in each arrangement. The conductive rod 350 provides a charge return path, such that charges from the environment can flow back to the sensors by coupling with a human hand operating the conductive rod. The same effect may be achieved through the use of a grounded conductive encapsulant.

Figure 22:
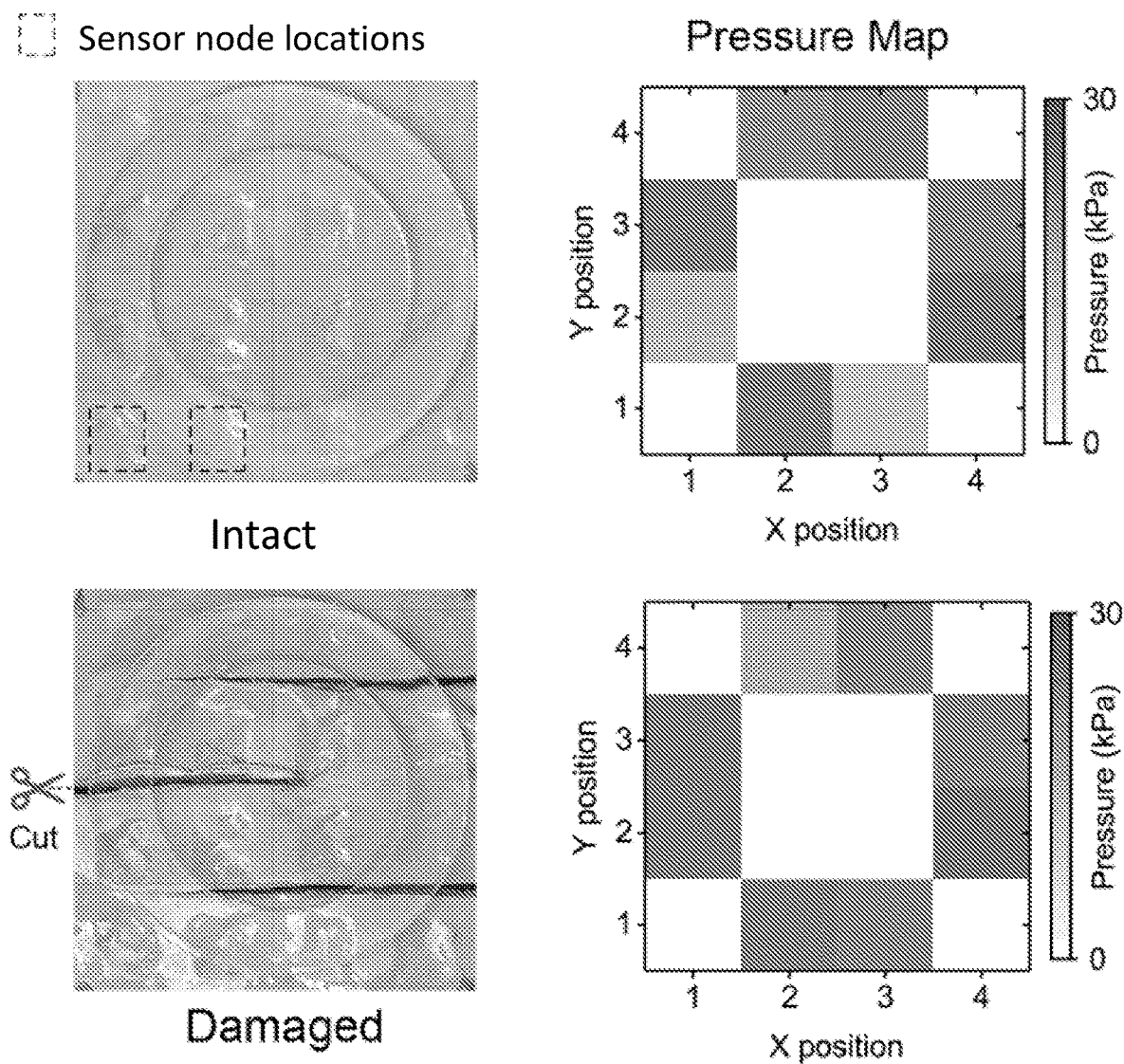
FIG. 22 shows a conductive fabric in intact and damaged states, and corresponding pressure maps of pressure sensors associated with the conductive fabric, according to one arrangement of the apparatus of the present disclosure.
Figure 23A:
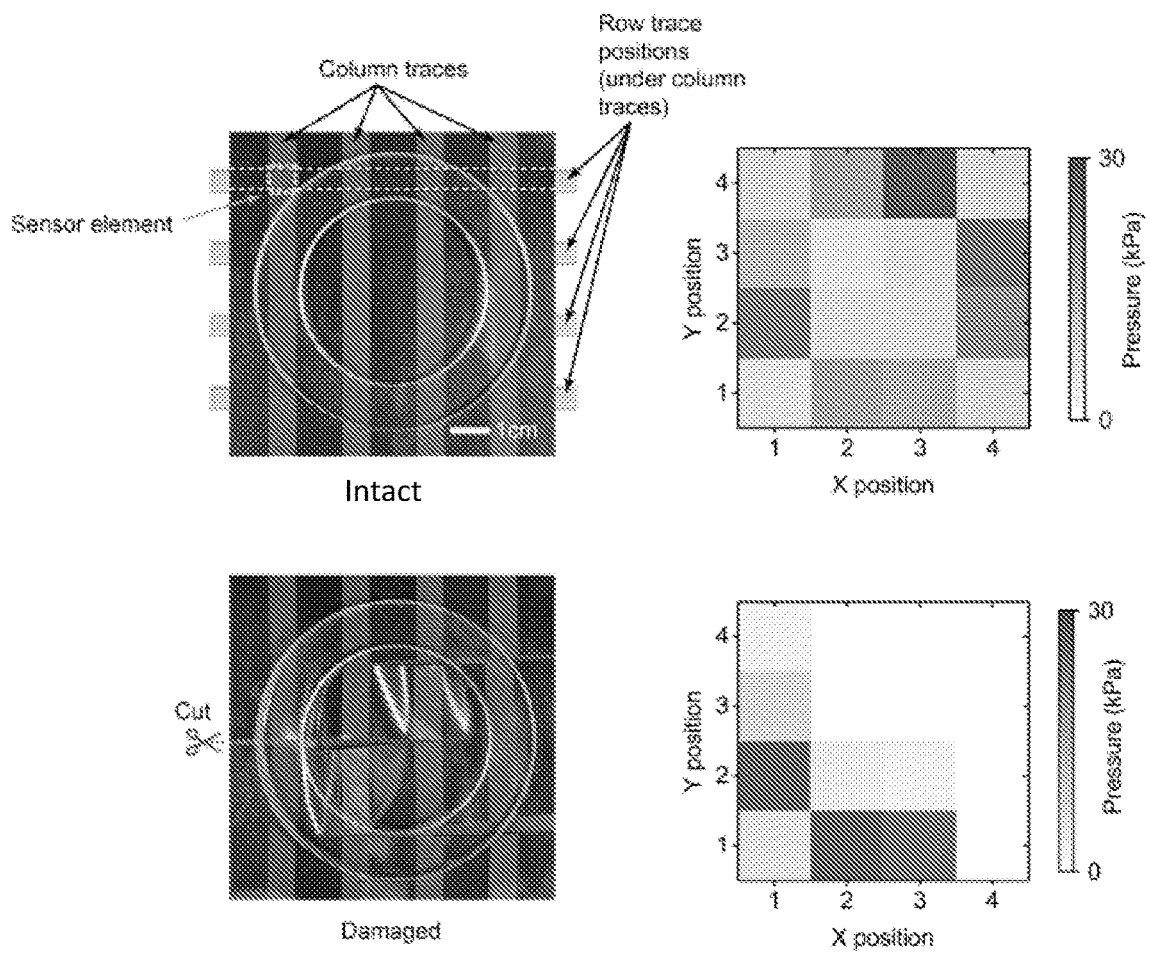
FIG. 23A shows conventional conductive traces in intact and damaged states, and corresponding pressure maps of pressure sensors associated with the traces.
Figure 23B:
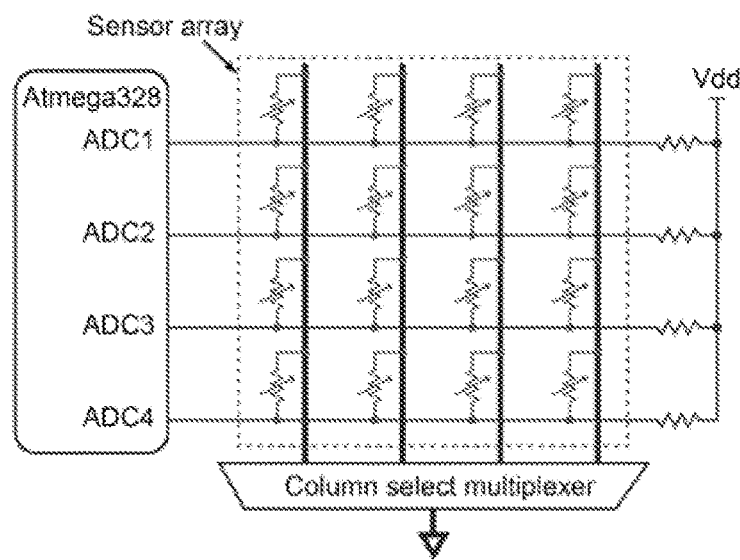
FIG. 23B shows a circuit diagram of the traces and the pressure sensors of FIG. 23A.

FIG. 22 shows, on the left, an intact state (top) and a damaged state (bottom, showing three cuts) of a communication medium of sixteen sensor nodes with respective integrated sensors, arranged in a grid formation. Shown on the right are corresponding representations of pressure detected by each sensor node in the intact state (top) and the damaged state (bottom), respectively. As discussed above in relation to FIGS. 18 to 20, the conductive fabric 111 or the mesh/planar conductor portion 111' provides redundant signal paths, allowing communication of the sensor nodes to remain unaffected even when the conductive fabric 111 or the mesh/planar conductor portion 111' is in the damaged state. In comparison, communication capability of an array of 16 sensors placed on a conventionally implemented row and column traces is significantly impaired when the traces are in a similar damaged state of three cuts (see FIGS. 23A and 23B).

Figure 24A:
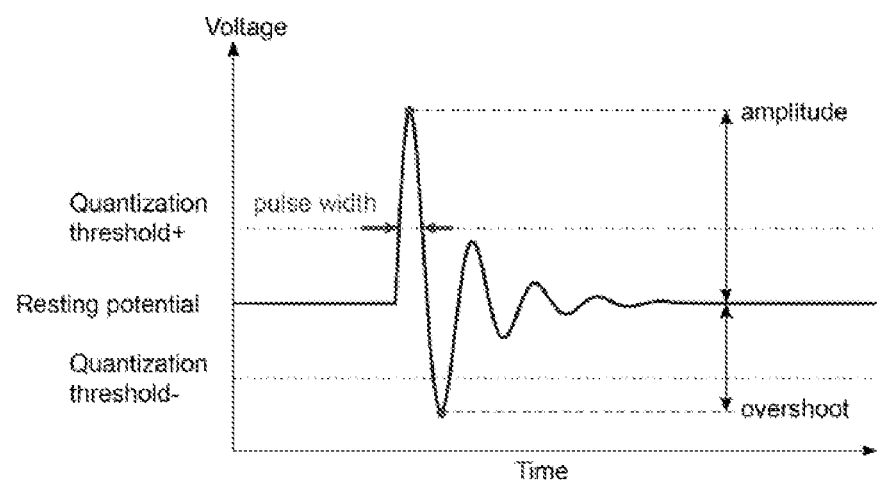
FIG. 24A shows a signal diagram showing a ringing effect caused by an increase in the number of sensor nodes.
Figure 24B:
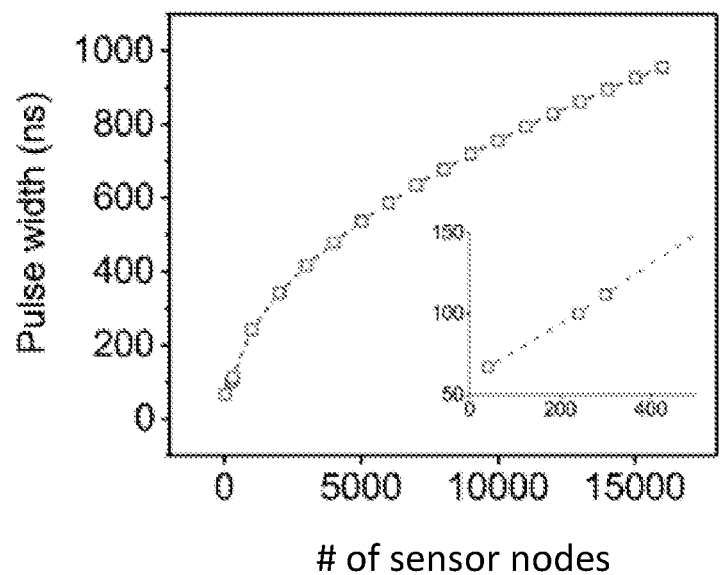
FIG. 24B shows a plot of pulse width versus the number of sensor nodes, in association with FIG. 24A.

The temporal precision of a sensor node 112 is limited mainly by the duration of a single voltage pulse. As more sensor nodes 112 are added to the array, the capacitance of the electrical conductor through which the pulses propagate also increases. The increased capacitance results in a reduced phase margin of the op-amp feedback loop (i.e., the summing circuit 120) and causes ringing in the output (FIG. 24A). The ringing can be reduced by increasing the feedback capacitance $C_F$ (i.e., the capacitance of the capacitor 123, FIG. 3) to improve stability. However, the pulse width will increase as a result (FIG. 24B). A SPICE simulation (Cadence® Spectre®) is used to determine how the pulse width changes with an increasing number of sensor nodes. The output of each sensor node 112 is modelled as a voltage source with a square wave. The edges of the waveform are high pass filtered to obtain the waveform of the voltage pulse (FIG. 24A). A transient simulation is run for N=200 to 16000. For each N, the value of $C_F$ is swept to find the minimum $C_F$ that has acceptably low levels of ringing where the overshoot does not exceed quantization threshold set at 40% of pulse amplitude. Finally, $F_{sample}$ is obtained as the reciprocal of the resultant pulse width, taken to be the length of time in which the voltage remains above quantization threshold.

As discussed above, the signatures associated with the sensor nodes are designed to be sent independently (asynchronously) with a high probability of correlation at the respective filters. Each pulse signature consists of W voltage pulses spaced apart at specific time instances $\tau=\{\tau_1, \tau_2 \ldots \tau_m\}$. At the receiving end, pulses are received at time instances $\tau'=\{\tau'_1, \tau'_2 \ldots \tau'_w\}$. The receiver finds the intersection $\tau=(\tau \cap \tau')$ where the cardinality /T/ denotes the correlation strength. If the correlation strength exceeds a pre-defined threshold (i.e., the correlation threshold value), a signature is deemed to have been correlated by the respective filter.

An ideal set of pulse signatures is one that has minimal autocorrelation (correlation between a particular signature and its time-shifted versions) and cross-correlation (correlation between a particular signature and other signatures in the set). There should also be enough unique signatures in the set to identify all sensor nodes in the array (cardinality). As discussed above, a family of pulse signatures may be characterized by the same 3 parameters:

F=the maximum number of pulses that fit within the duration of a signature;
ω=weight or the number of pulses per signature; and
λ=maximum allowable interference (autocorrelation and cross-correlation) between two signatures.

For a pulse signature with a signature duration (Ts) of 1 ms and a pulse duration (Tp) of 100 ns:

$$F = \frac{Ts}{Tp} = 10000$$

Parameters ω and λ are closely related to the error performance of the receiver. Under ideal conditions, all ω voltage pulses of the target signature should be successfully correlated, and thus ω is the maximum correlation. λ is the maximum cross-correlation allowed between signatures of the same family. If N non-target signatures overlap with the target signature, the amount of interference could be as high as N×λ. Error performance will thus degrade if N×λ is much larger than ω.

The number of unique pulse signatures must match that of the sensor nodes. To accommodate for thousands of the sensor nodes, the pulse signatures may be configured to have λ=2 such that the number of signatures (C) satisfies:

$$C \leq \frac{(F-1)(F-2)}{\omega(\omega-1)(\omega-2)}$$

Therefore, with F=10000 and ω=10, the array can accommodate up to 138,847 sensor nodes, which should be sufficient in most cases for whole body robot sensor skins. As described above, the pulse signatures are electrical and can be either positive or negative (i.e., have positive or negative pulses), which allows each signature to take on several variants. For instance, two signatures of the same pulse positions and opposite pulse polarities may be considered to be two states or variants of a single signature, for indicating a binary '1' and a binary '0', respectively. With such a consideration, a single signature may be used by a FA sensor to indicate, using the two states or variants of the signature, an increase and a decrease in pressure. This is not possible with Optical Code Divisional Multiple Access used in fibre optic communication, which requires complicated optical devices for signal generation and transmission.

Some advantages of the present disclosure are discussed below.

Stimuli of a stimulus event can be sparse or dense. To achieve an accurate spatiotemporal representation of the stimulus event (e.g. vision, hearing, taste, touch, smell, etc.), sensory signals must be generated and transmitted with a high temporal resolution. The apparatus 100 is well suited for such tasks. Firstly, sensory signals generated by the respective sensors 113 are transmitted by the respective sensor nodes 112 in the form of respective unique pulse signatures 200 through the conductive fabric 111. The process does not require any complex circuitry for digitisation. Further, the sensor nodes 112 do not require any implementation of synchronization or collision sensing. Further, no common signal ground is needed. The sensor nodes 112 can transmit respective unique pulse signatures 200 independently at any instance with minimal communication overhead. Contrary to conventional frame-based sensors where readings are periodically polled by a controller, each sensor node 112 transmits the respective signature 200 only when a stimulus is detected by the respective sensor 113.

The temporal resolution achievable by the receiver 130 is limited mainly by a response time of the edge detection circuit, which, depending on implementation, can be less than a few nanoseconds and be well above the sampling period of any existing sensor arrays (e.g. tactile sensor arrays). The apparatus 100 is able to resolve signatures 200 transmitted microseconds apart. The receiver 130 can also be configured to activate some of its components (e.g., the filters 132) only when its edge detection circuit detects an edge in the incoming signal. This configuration will greatly reduce the power consumption of the receiver 130, particularly where the stimuli of the stimulus event are sparse.

Moreover, signal communication via the conductive fabric 111 or the mesh/planar conductor portion 111' is highly robust to damages such as tears. As such, sensor nodes 112 may be flexibly arranged with respect to the conductive fabric 111 or the mesh/planar conductor portion 111' without increasing wiring complexity. Such arrangements can be considered to provide redundancy signal conducting paths for each sensor node 112. Therefore, density and distribution of the sensor nodes 112 can be flexibly varied to suit various application requirements.

Where the communication medium 110 is implemented to include thousands of sensor nodes 112 each associated with a unique pulse signature 200, the apparatus 100 can achieve a bit error rates (BER) of around 0.01 (1%) even with the sensor nodes 112 transmitting the respective pulse signature 200 within 1 millisecond from one another. Where the stimuli are sparse, an even lower BER is can be achieved. The apparatus 100 can achieve a high scalability, potentially up to millions of sensor nodes 112.

In addition, voltage pulses are less susceptible to low frequency interferences (e.g. from a source of AC power noise). They can also be detected without the need for expensive high-resolution ADCs. Voltage pulses have a much shorter duration compared to a chip in CDMA. This is equivalent to having a relatively high spread factor, achieving a significantly higher capacity than possible with CDMA.

The pulses are bipolar and therefore the signatures 200 can be asynchronously transmitted. Conversely, Optical CDMA pulses are unipolar and thus are not decodable without the use of additional synchronization signals/protocols. In addition, Optical CDMA uses fibre optics, which are not as damage resistant in terms of signal conducting path, and requires dedicated electro-optical components.

The apparatus 100 can achieve a high scalability and can be implemented for ultra-fast somatosensory applications. It can also maintain a near-constant ultra-high precision spatiotemporal pattern of stimulation from the sensors to the receiver and can support even tens of thousands of sensors. The conductive fabric requires minimal wiring complexity, can provide high degrees of flexibility in sensor node placement, and provides robust signal conducting paths for the sensor nodes.

With the above advantages, the apparatus 100 is particularly useful in next generation Artificial Intelligence (AI) driven-robots and autonomous systems in industries such as hospitals and home care, where robots may be deployed in rapidly changing complex environments. It will also be useful in many other applications involving human-machine interfaces, such as wearable assistive exo-skeleton suits requiring rapid tactile environment feedback.

Some alternative arrangements of the present disclosures are discussed below.

In an alternative embodiment, the unique pulse signature of one of the sensor nodes has a first signature duration and the unique pulse signature of another of the sensor nodes has a second signature duration different from the first signature duration. That is, the unique pulse signatures may have different numbers of pulses. The unique pulse signatures may have different signature durations. The unique pulse signatures may have different pulse durations. As long as the signatures are unique, any suitable arrangements may be adopted.

In other embodiments, the sensor nodes 112 can be realised in any suitable form of specialized analog or digital circuits.

The communication medium 110 may be adapted to cover at least a portion of, for example, a vehicle or a human.

The stimulus event may be an optical event, temperature, pressure or stimuli associated with electromagnetic waves. The stimulus event may relate to chemical, smell, audio, vibratory stimulation. The stimulus event may be a combination of different stimulus types and can include $2^{nd}$ order (processed) signals such as friction, slippage, wetness, hardness, etc. Indeed, the triggering event may be non-stimulus related. A skilled person would also appreciate that each sensor node can be associated with any type of sensor, provided that the sensor node is associated a signature for each possible state of detection of the sensory signal of the associated sensor.

The receiver 130 may be arranged local to the sensor nodes 112 of the receiver 130 may be arranged remote to the sensor nodes 112 and the transmission medium may be via any medium suitable for wireless transmission.

The sensors 113 may include tactile/pressure sensors of different sensitivities. They may also include different types of sensors, such as bio-mimetic tactile receptors, optical sensors including silicon electronics based ones, etc, acoustic sensors, piezo-electric sensors and other sensors that may or may not have neuro-morphic features. Sensors for the detection of electro-magnetic fields, humidity, surface textures, vibrations, acceleration, optical, temperature, chemical, shear, proximity/light, etc., may also be included.

The conductive medium may include at least one of a conductive fabric, a conductive bulk conductor, a conductive substrate, a conductive solid, a conductive gel, and a conductive fluid, provided that the transmission medium is able to conduct the signatures transmitted by the sensor nodes 112. The conductive fluid (e.g., conductive liquid) or the conductive gel may be in-filled within micro-channels of, for example, a micro-fluidic device.

Each sensor node 112 may be associated with additional signatures to indicate states (e.g., operation, debug, battery level, error, debug, and modalities) of the respective sensor node 112.

A variety of other variations and modifications which do not depart from the scope of the invention will be evident to persons of ordinary skill in the art from the disclosure herein. The following claims are intended to cover the specific embodiments set forth herein as well as such variations, modifications, and equivalents.

The invention claimed is:

1. A sensor-based communication apparatus comprising:
a plurality of sensor nodes associated with respective unique pulse signatures and adapted to communicate with respective sensors with each sensor configured to generate a sensory signal in response to a respective stimulus, wherein each sensor node is triggered, upon receipt of the corresponding sensory signal, to transmit the associated unique pulse signature independently and asynchronously through a transmission medium shared by the sensor nodes, the unique pulse signatures transmitted by the sensor nodes being a representation of a stimulus event associated with the stimuli detected by the corresponding sensors, wherein the sensor-based communication apparatus further comprises:
a receiver configured to receive through the transmission medium an incoming signal relating to the transmitted unique pulse signatures, to correlate the associated unique pulse signature of each sensor node with an intermediate signal relating to the incoming signal, and to provide indication signals indicating respective times of triggering of the sensor nodes based on a result of correlation for representation of the stimulus event; and wherein the receiver includes a plurality of filters each activated, upon detection of an edge in the incoming signal by the receiver, to correlate the intermediate signal with a corresponding one of the unique pulse signatures.

2. A sensor-based system, comprising:
a plurality of sensors arranged on a conductive medium, wherein each of the plurality of sensors is configured to output a sensory signal in response to a received stimulus;
a plurality of sensor nodes, wherein each of the plurality of sensor nodes is associated with a corresponding one of the plurality of sensors, and wherein each of the plurality of sensor nodes includes a pulse generator configured to generate a unique pulse signature in response to a sensory signal received from the corresponding one of the plurality of sensors; and
a receiver configured to receive, via the conductive medium, a plurality of unique pulse signatures generated by the plurality of sensor nodes and to determine, based on analysis of the received plurality of unique pulse signatures, identities of the plurality of sensor nodes from which the plurality of unique pulse signatures originated and at least one characteristic of the stimulus received by the sensor associated with each of the identified plurality of sensor nodes.

3. The sensor-based system of claim 2, wherein each of the plurality of sensors comprises a piezoresistive element.

4. The sensor-based system of claim 2, wherein the plurality of sensors includes at least a first sensor configured to detect applied pressure levels and at least a second sensor configured to detect changes in applied pressure.

5. The sensor-based system of claim 2, wherein the plurality of sensors includes at least one sensor configured to detect a temperature level.

6. The sensor-based system of claim 2, wherein the received stimulus includes at least one of an applied pressure, a change in an applied pressure, or a temperature level.

7. The sensor-based system of claim 2, wherein the pulse generator included in each of the plurality of sensor nodes is a digital pulse generator configured to generate the unique pulse signature.

8. The sensor-based system of claim 2, wherein the pulse generator included in each of the plurality of sensor nodes includes a microcontroller pre-programmed to generate the unique pulse signature.

9. The sensor-based system of claim 2, wherein the pulse generator is configured to generate the unique pulse signature in response to receipt of a sensor signal indicating a change in applied pressure level.

10. The sensor-based system of claim 9, wherein a polarity of the unique pulse signature indicates whether the change in applied pressure level is an increase or a decrease in the applied pressure level.

11. The sensor-based system of claim 2, wherein the pulse generator is configured to generate the unique pulse signature at a frequency dependent upon an applied pressure level.

12. The sensor-based system of claim 2, wherein the pulse generator is configured to generate the unique pulse signature at a frequency dependent upon a temperature level at a corresponding one of the plurality of sensors.

13. The sensor-based system of claim 2, wherein at least some of the plurality of unique pulse signatures received by the receiver overlap in time.

14. The sensor-based system of claim 2, wherein each of the plurality of unique pulse signatures received by the receiver is unique to a particular one of the plurality of sensor nodes.

15. The sensor-based system of claim 2, wherein each of the plurality of unique pulse signatures comprises a collection of individual pulses spaced apart from one another in time.

16. The sensor-based system of claim 15, wherein the collection of individual pulses included in each of the plurality of unique pulse signatures differs from the collections of individual pulses included in all others of the plurality of unique pulse signatures in at least one respect.

17. The sensor-based system of claim 16, wherein the at least one respect includes a total time duration of the collection of individual pulses.

18. The sensor-based system of claim 16, wherein the at least one respect includes a timing of the collection of individual pulses within a corresponding unique pulse signature.

19. The sensor-based system of claim 16, wherein the at least one respect includes a duration of one or more of the individual pulses.

20. The sensor-based system of claim 16, wherein the at least one respect includes a polarity of one or more of the individual pulses.

21. The sensor-based system of claim 16, wherein the at least one respect includes a total number of individual pulses included in a corresponding unique pulse signature.

22. The sensor-based system of claim 2, wherein each of the unique pulse signatures has a total duration of less than 1 millisecond.

23. The sensor-based system of claim 2, wherein the plurality of unique pulse signatures generated by the plurality of sensor nodes are superimposed on a common electrical conductor included in the conductive medium.

24. The sensor-based system of claim 2, wherein the conductive medium includes redundant electrically conductive paths such that each of the plurality of sensor nodes is electrically connected to the receiver by two or more different electrically conductive paths.

25. The sensor-based system of claim 2, wherein the identities of the plurality of sensor nodes from which the plurality of unique pulse signatures originated are determined by deconvolution of the plurality of unique pulse signatures received by the receiver.

26. The sensor-based system of claim 25, wherein a positive identification of a particular sensor node is determined based on whether, during the deconvolution, a correlation strength between a known unique pulse signature and at least a portion of the received plurality of unique pulse signatures, superimposed together, exceeds a predetermined threshold.

27. The sensor-based system of claim 2, wherein the determined at least one characteristic of the stimulus received by the sensor associated with each of the identified plurality of sensor nodes includes one or more of a change in an applied pressure level, an applied pressure level, or a temperature level.

28. The sensor-based system of claim 2, wherein the receiver is further configured to detect a slippage event based on the determined identities of the plurality of sensor nodes from which the plurality of unique pulse signatures originated and the determined at least one characteristic of the stimulus received by the sensor associated with each of the identified plurality of sensor nodes.

29. The sensor-based system of claim 2, wherein the receiver is further configured to generate a spatio-temporal map of a stimulus event based on the determined identities of the plurality of sensor nodes from which the plurality of unique pulse signatures originated and the determined at least one characteristic of the stimulus received by the sensor associated with each of the identified plurality of sensor nodes.

30. A sensor-based method, comprising:
receiving, via an electrically conductive medium, a plurality of unique pulse signatures, wherein each of the unique pulse signatures is associated with a particular sensor node among a plurality of sensor nodes, and wherein at least some of the unique pulse signatures overlap in time with one another; and
determining, based on analysis of the received plurality of unique pulse signatures, identities of the plurality of sensor nodes from which the plurality of unique pulse signatures originated and at least one characteristic of a stimulus received by a sensor associated with each of the identified plurality of sensor nodes.

31. The sensor-based method of claim 30, wherein each of the plurality of unique pulse signatures includes a collection of individual pulses, and wherein the collection of individual pulses included in each of the plurality of unique pulse signatures differs from the collections of individual pulses included in all others of the plurality of unique pulse signatures in at least one respect.

32. The sensor-based method of claim 31, wherein the at least one respect includes a total time duration of the collection of individual pulses.

33. The sensor-based method of claim 31, wherein the at least one respect includes a timing of the collection of individual pulses within a corresponding unique pulse signature.

34. The sensor-based method of claim 31, wherein the at least one respect includes a duration of one or more of the individual pulses.

35. The sensor-based method of claim 31, wherein the at least one respect includes a polarity of one or more of the individual pulses.

36. The sensor-based method of claim 31, wherein the at least one respect includes a total number of individual pulses included in a corresponding unique pulse signature.

37. The sensor-based method of claim 30, wherein the electrically conductive medium includes redundant electrically conductive paths such that each of the plurality of sensor nodes is electrically connected to a receiver, which receives the plurality of unique pulse signatures, by two or more different electrically conductive paths.

38. The sensor-based method of claim 30, wherein the identities of the plurality of sensor nodes from which the plurality of unique pulse signatures originated are determined by deconvolution of the received plurality of unique pulse signatures.

39. The sensor-based method of claim 38, wherein a positive identification of a particular sensor node is determined based on whether, during the deconvolution, a correlation strength between a known unique pulse signature and at least a portion of the received plurality of unique pulse signatures, superimposed together, exceeds a predetermined threshold.

40. The sensor-based method of claim 30, wherein the determined at least one characteristic of the stimulus received by the sensor associated with each of the identified plurality of sensor nodes includes one or more of a change in an applied pressure level, an applied pressure level, or a temperature level.

41. The sensor-based method of claim 30, further including detecting a slippage event based on the determined identities of the plurality of sensor nodes from which the plurality of unique pulse signatures originated and the determined at least one characteristic of the stimulus received by the sensor associated with each of the identified plurality of sensor nodes.

* * * * *